US012531021B2

(12) United States Patent
Xie

(10) Patent No.: US 12,531,021 B2
(45) Date of Patent: Jan. 20, 2026

(54) DRIVING METHOD FOR DISPLAY PANEL, AND DISPLAY DEVICE

(71) Applicant: Xiamen Tianma Display Technology Co., Ltd., Xiamen (CN)

(72) Inventor: Jianfeng Xie, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/408,112

(22) Filed: Jan. 9, 2024

(65) Prior Publication Data

US 2024/0161667 A1 May 16, 2024

(30) Foreign Application Priority Data

Oct. 24, 2023 (CN) ........................ 202311388947.X

(51) Int. Cl.

*G09G 3/3233* (2016.01)
*G09G 3/00* (2006.01)
*G09G 3/3266* (2016.01)

(52) U.S. Cl.

CPC ........... *G09G 3/3233* (2013.01); *G09G 3/006* (2013.01); *G09G 3/3266* (2013.01); *G09G 2310/08* (2013.01); *G09G 2320/043* (2013.01); *G09G 2330/021* (2013.01)

(58) Field of Classification Search

CPC .... G09G 3/3233; G09G 3/006; G09G 3/3275; G09G 3/3283; G09G 3/3291; G09G 3/3685; G09G 3/3688; G09G 2330/021; G09G 2330/023

See application file for complete search history.

(56) References Cited

U.S. PATENT DOCUMENTS

2015/0364088 A1* 12/2015 Zheng .................. G09G 3/3216 345/83
2016/0049133 A1* 2/2016 Park ..................... G09G 3/3648 345/212
2016/0093270 A1* 3/2016 Lee ...................... G09G 3/3688 345/82
2018/0025689 A1* 1/2018 Aamold ............... G09G 3/2007 345/212
2018/0286305 A1* 10/2018 Kim ..................... G09G 3/3275
2021/0335182 A1* 10/2021 Hwang .................... G09G 3/20
2022/0084453 A1* 3/2022 Pyun .................... G09G 3/2011

* cited by examiner

*Primary Examiner* — Xuemei Zheng
(74) *Attorney, Agent, or Firm* — KDW FIRM PLLC

(57) ABSTRACT

Provided are a driving method for a display panel, and a display device. The display panel includes multiple pixels arranged in an array and multiple data lines, pixels located in the same column are electrically connected to the same data line, and the multiple data lines are configured to provide data signals for the multiple pixels in stages. The driving method includes acquiring a voltage difference between data signals provided for each data line in two adjacent stages; determining a charge current of each data line according to the voltage difference; and providing the data signal for each data line with the charge current.

14 Claims, 12 Drawing Sheets

DRIVING METHOD FOR DISPLAY PANEL, AND DISPLAY DEVICE

CROSS-REFERENCE TO RELATED APPLICATIONS

This application claims priority to Chinese patent application No. 202311388947.X filed with the China National Intellectual Property Administration (CNIPA) on Oct. 24, 2023, the disclosure of which is incorporated herein by reference in its entirety.

TECHNICAL FIELD

The present disclosure relates to display technologies and, in particular, to a driving method for a display panel, and a display device.

BACKGROUND

In an organic light-emitting diode (OLED) display panel, a pixel driving circuit receives a data signal, and the pixel driving circuit drives the connected light-emitting unit to emit light according to the data signal. Generally, one data line is connected to multiple pixel driving circuits. When one data line writes data signals into different pixel driving circuits in sequence, the voltage of the data signal on the data line does not switch instantaneously, causing display problems.

SUMMARY

The present disclosure provides a driving method for a display panel, and a display device.

According to an aspect of the present disclosure, a driving method for a display panel is provided. The display panel includes multiple pixels arranged in an array and multiple data lines, pixels located in the same column are electrically connected to the same data line, and the multiple data lines are configured to provide data signals for the multiple pixels in stages. The driving method includes the steps described below.

A voltage difference between data signals provided for each data line in two adjacent stages is acquired.

A charge current of each data line is determined according to the voltage difference.

A data signal is provided for each data line with the charge current.

According to another aspect of the present disclosure, a driving device for a display panel is provided. The display panel includes multiple pixels arranged in an array and multiple data lines, pixels located in the same column are electrically connected to the same data line, and the multiple data lines are configured to provide data signals for the multiple pixels in stages. The driving device includes a voltage difference acquisition module, a charge current determination module, and a drive module.

The voltage difference acquisition module is configured to acquire a voltage difference between data signals provided for each data line in two adjacent stages.

The charge current determination module is configured to determine a charge current of each data line according to the voltage difference.

The drive module is configured to provide a data signal for each data line with the charge current.

According to another aspect of the present disclosure, a display device is provided and includes a display panel and a display driver circuit.

The display panel includes multiple pixels arranged in an array and multiple data lines, pixels located in the same column are electrically connected to the same data line, and the multiple data lines are configured to provide data signals for the multiple pixels in stages; and the display driver circuit is configured to perform the preceding driving method for a display panel.

It is to be understood that the content described in this section is neither intended to identify key or critical features of the embodiments of the present disclosure nor intended to limit the scope of the present disclosure. Other features of the present disclosure become easily understood through the description provided hereinafter.

BRIEF DESCRIPTION OF DRAWINGS

To illustrate the technical schemes in embodiments of the present disclosure more clearly, the drawings used in the description of the embodiments are briefly described below. Apparently, the drawings described below merely illustrate part of the embodiments of the present disclosure, and those of ordinary skill in the art may obtain other drawings based on the drawings described below on the premise that no creative work is done.

DETAILED DESCRIPTION

To make the schemes of the present disclosure better understood by those skilled in the art, the technical schemes in the embodiments of the present disclosure are described below clearly and completely in conjunction with the drawings in the embodiments of the present disclosure. Apparently, the embodiments described below are part, not all, of the embodiments of the present disclosure. Based on the embodiments of the present disclosure, all other embodiments obtained by those of ordinary skill in the art on the premise that no creative work is done are within the scope of the present disclosure.

It is to be noted that terms "first", "second", and the like in the description, claims, and drawings of the present disclosure are used for distinguishing between similar objects and are not necessarily used for describing a particular order or sequence. It is to be understood that the data used in this manner is interchangeable in appropriate cases so that the embodiments of the present disclosure described herein can be implemented in an order not illustrated or described herein. In addition, terms "comprising", "including", and any variation thereof are intended to encompass a non-exclusive inclusion. For example, a process, method, system, product, or device that includes a series of steps or units not only includes the expressly listed steps or units, but may also include other steps or units that are not expressly listed or are inherent to such a process, method, product, or device.

Figure 1:
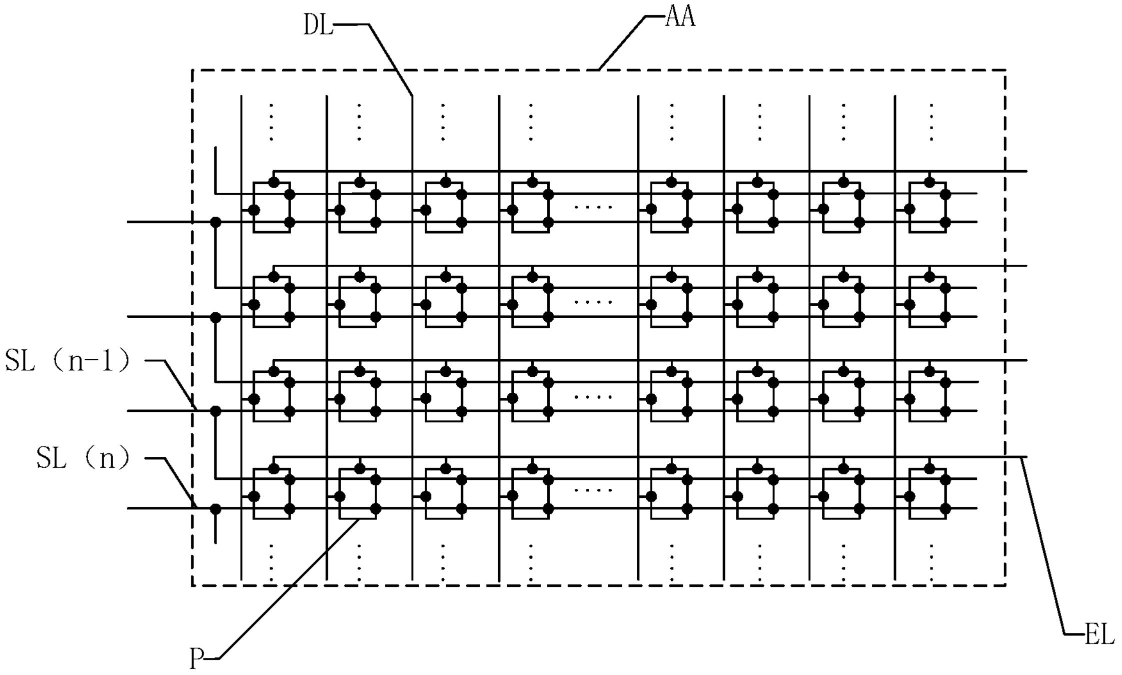
FIG. 1 is a top diagram of a display panel in the related art.

FIG. 1 is a top diagram of a display panel in the related art. To simplify the drawing and facilitate the description, only part of the structure of the display panel is shown in FIG. 1. Referring to FIG. 1, a display region AA of the display panel includes multiple pixels P arranged in an array. The display region AA further includes multiple scan lines SL extending in the row direction and arranged in the column direction, multiple light emission control lines EL extending in the row direction and arranged in the column direction, and multiple data lines DL extending in the column direction and arranged in the row direction, and the data lines DL are electrically connected to a display driver circuit (not shown in the figure). Pixels P in the same row are electrically connected to the same scan line SL(n), and the scan line SL(n) provides a scan signal Scan(n) for the pixels P in this row simultaneously. The pixels P in this row may also be electrically connected to a scan line SL(n−1) in the previous row, and the pixels P in this row may also receive a scan signal Scan(n−1) of the previous row. Pixels P located in the same row are electrically connected to the same light emission control line EL, and the light emission control line EL provides a light emission control signal Emit for the pixels P in this row simultaneously. Pixels P located in the same column are electrically connected to the same data line DL, and the data line DL provides a data signal Data for the pixels P in this column in stages.

It is to be understood that the display region AA further includes a first power signal line, a second power signal line, a first reset signal line, and a second reset signal line (not shown in the figure). The first power signal line is coupled to power write transistors M1 in all the pixels P and configured to provide a first power signal PVDD. The second power signal line is coupled to light-emitting elements (OLED) in all the pixels P and configured to provide a second power signal PVEE, where the light-emitting element (OLED) is driven by a pixel driving circuit in the pixel P and includes, but is not limited to, a light-emitting device such as a microLED and a mini LED. The first reset signal line is coupled to first reset transistors M5 in all the pixels P and configured to provide a first reset signal Vref1. The second reset signal line is coupled to second reset transistors M7 in all the pixels P and configured to provide a second reset signal Vref2. Generally, the first power signal PVDD, the second power signal PVEE, the first reset signal Vref1, and the second reset signal Vref2 are all fixed signals. Of course, in some application scenarios, at least one of the first power signal PVDD, the second power signal PVEE, the first reset signal Vref1, and the second reset signal Vref2 may be configured to be variable. It is no longer described in the embodiments of the present disclosure.

Figure 2:
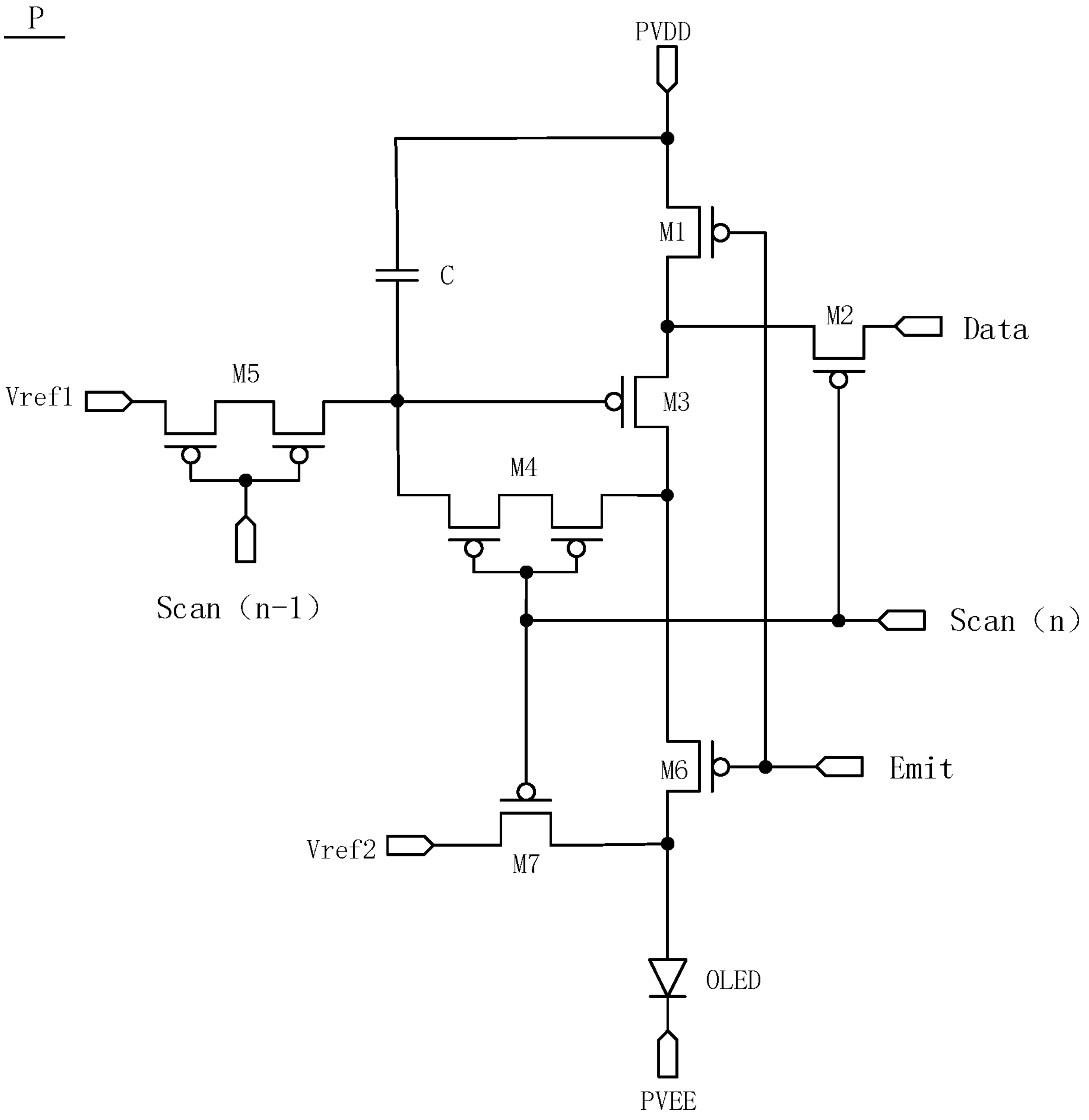
FIG. 2 is a schematic diagram of a circuit structure of a pixel in the display panel in FIG. 1.
Figure 3:
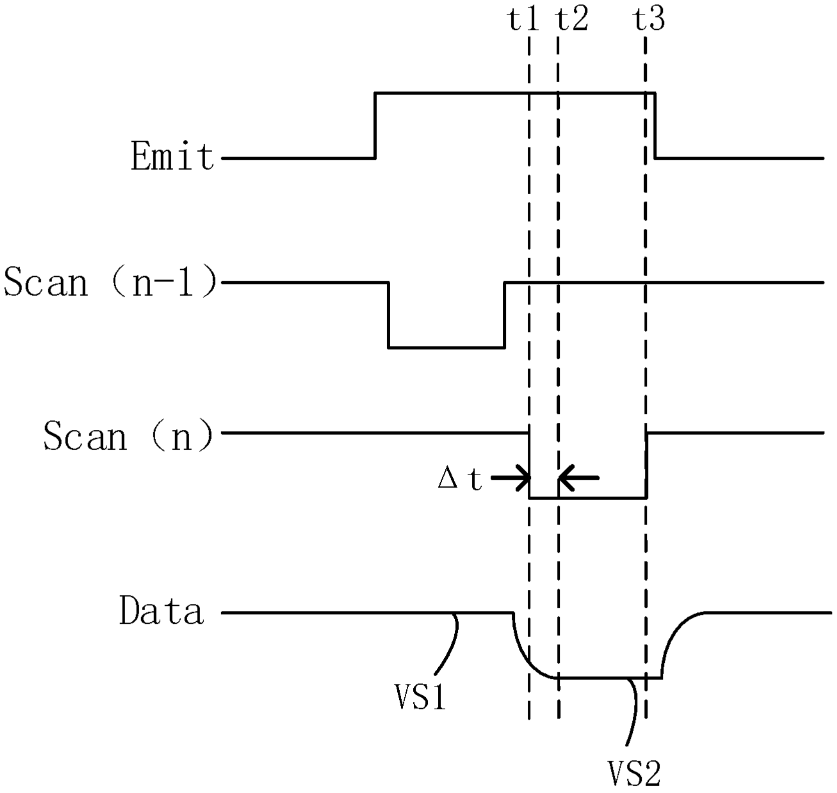
FIG. 3 is a drive timing diagram of the pixel in FIG. 2.

FIG. 2 is a schematic diagram of a circuit structure of a pixel in the display panel in FIG. 1, and FIG. 3 is a drive timing diagram of the pixel in FIG. 2. Referring to FIGS. 1, 2, and 3, the pixel P includes a power write transistor M1, a data write transistor M2, a drive transistor M3, a compensation transistor M4, a first reset transistor M5, a light emission control transistor M6, a second reset transistor M7, and a storage capacitor C. Scan line SL(n−1) in the previous row is coupled to gates of first reset transistors M5 of pixels P in the current row and configured to provide a scan signal Scan(n−1) of the previous row as a reset control signal for the gates of the first reset transistors M5. When the reset control signal is at an enable level, a potential at a gate of the drive transistor M3 is reset. Scan line SL(n) in the current row is coupled to gates of data write transistors M2 of pixels P in the same row and configured to provide a scan signal Scan(n) of the current row as a write control signal for the gates of the data write transistors M2. When the write control signal is at an enable level, the data signal Data on the data line DL is written into the gate of the drive transistor M3. The light emission control line EL is coupled to gates of the power write transistors M1 and gates of light emission control transistors M6 of pixels P in the same row and configured to provide the light emission control signal. When the light emission control signal is at an enable level, a loop where the light-emitting element (OLED) is located forms a path, and the current in the light-emitting element (OLED) is related to the voltage of the data signal Data.

With continued reference to FIGS. 1, 2, and 3, when the scan signal Scan(n−1) of the previous row is at an enable low level, in this stage, the data signal Data on each data line DL is written into the gate of the drive transistor M3 of each pixel P in the previous row. When the scan signal Scan(n) of the current row is at an enable low level, in this stage, the data signal Data on each data line DL is written into the gate of the drive transistor M3 of each pixel P in the current row. However, when the voltage VS2 of the data signal Data that needs to be written into a pixel P of a column in the current row is greatly different from the voltage VS1 of the data signal Data that needs to be written into a pixel P of the same column in the previous row, it takes a relatively long time for the voltage of the data signal Data on the data line DL to change from the voltage VS1 to the voltage VS2. At a moment t1 when the pixel P in the current row starts to write the data signal Data on the data line DL electrically connected to pixels P in this column into the gate of the drive transistor M3, that is, at the moment t1 when the data write transistor M2 is turned on, the data signal Data is not in a stable state. At a moment t2 when the data signal Data on the data line DL electrically connected to the pixels P in this column tends to be stable, the data write transistors M2 of pixels P in the current row are turned on for a period Δt, the time for the data signal Data being written into the gate of the drive transistor M3 is reduced, very likely causing the following case: at a moment t3 when the data write transistor M2 is turned off, the data signal Data is not successfully written into the gate of the drive transistor M3, when the light-emitting element (OLED) emits light, the voltage at the gate of the drive transistor M3 is not equal to the voltage VS2 of the data signal Data, and the display is inaccurate.

In the related art, a method of uniformly increasing the charge currents of all the data lines DL in the data signal write stage is generally adopted so that the charging time of the data signal Data on the data line DL is reduced, and the data signal Data quickly reaches a stable state. However, the power consumption and heat generation of the display panel are increased, affecting the service life of the display panel and the battery life of the display device.

The embodiments of the present disclosure provide a driving method for a display panel. The display panel includes multiple pixels arranged in an array and multiple data lines, pixels located in the same column are electrically connected to the same data line, and the multiple data lines are configured to provide data signals for the multiple pixels in stages. The driving method includes acquiring a voltage difference between data signals provided for each data line in two adjacent stages; determining a charge current of each data line according to the voltage difference; and providing a data signal for each data line with the charge current.

When the preceding technical schemes are adopted, the voltage difference between the data signals provided for each data line in two adjacent stages is acquired, and the charge current of each data line may be determined according to the voltage difference so that the display driver circuit can write the data signal into each data line with the charge current determined by the voltage difference. The voltage value of the data signal on each data line can reach the required set value in a short period of time so that the time for the data signal being written into the gate of the drive transistor can be increased. When a light-emitting element emits light, the voltage at the gate of the drive transistor can be equal to the voltage of the data signal, thereby improving the display accuracy. In addition, in different frames or different rows of pixels, the voltage difference between the data signals provided for each data line in two adjacent stages changes dynamically, and the charge current of each data line can be dynamically adjusted according to the overloading conditions of different frames or different rows of pixels, thereby addressing the increased power consumption and increased heat generation due to the uniform increase in the charge currents of all the data lines in the data signal write stage in the related art.

The preceding is the core idea of the present disclosure. Based on the embodiments of the present disclosure, all other embodiments obtained by those of ordinary skill in the art on the premise that no creative work is done are within the scope of the present disclosure. The technical schemes in the embodiments of the present disclosure are described clearly and completely hereinafter in conjunction with the drawings in the embodiments of the present disclosure.

The display panel in FIG. 1 is used as an example. The display panel includes multiple pixels P arranged in an array and multiple data lines DL. Pixels P located in the same column are electrically connected to the same data line DL. The data lines DL are configured to provide the data signals Data for the multiple pixels P in stages. The driving method for a display panel provided in the embodiment of the present disclosure may drive the display panel shown in FIG. 1. The similarities between the embodiments of the present disclosure and the related art are not repeated, and only the differences are described.

It is to be noted that FIG. 1 merely shows an exemplary display panel that can be driven by the driving method for a display panel provided in the embodiments of the present disclosure. The driving method for a display panel provided in the embodiments of the present disclosure can also drive display panels of other structures, which are not limited to the embodiments of the present disclosure.

Figure 4:
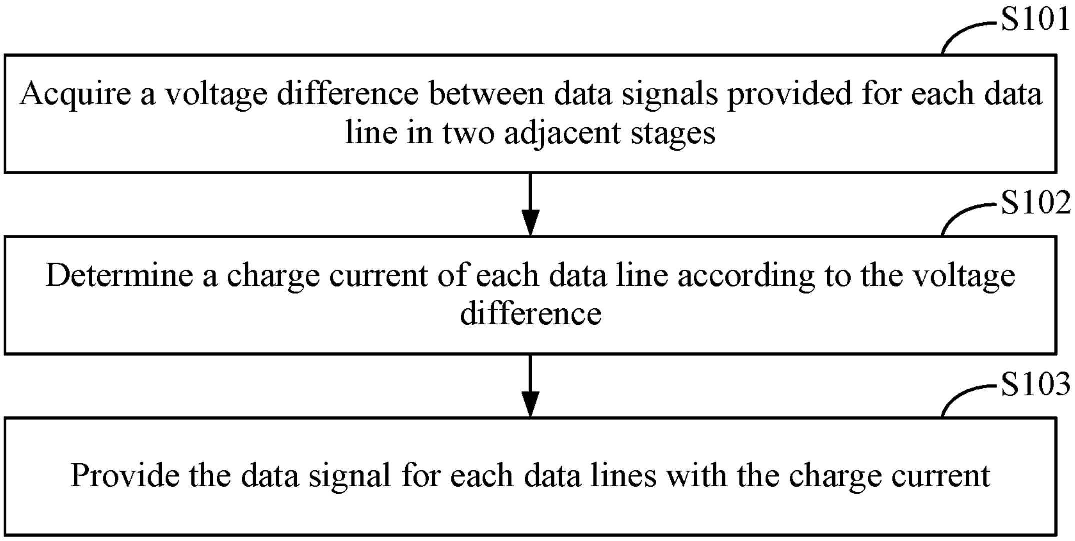
FIG. 4 is a flowchart of a driving method for a display panel according to an embodiment of the present disclosure.

FIG. 4 is a flowchart of a driving method for a display panel according to an embodiment of the present disclosure. Referring to FIG. 4, the driving method includes the steps described below.

In S101, a voltage difference between data signals provided for each data line in two adjacent stages is acquired.

The stage in the two adjacent stages refers to a stage in which the display driver circuit writes the data signal Data into the data line DL. In the two adjacent stages, the data signals Data written by the display driver circuit into the data line DL may be the same or different. Generally speaking, the stage in which the display driver circuit writes the data signal Data into the data line DL is after the data write stage of pixels P in the previous row and before the data write stage of pixels P in the current row.

The data signal Data provided for the data line DL refers to the data signal Data that needs to be written into the data line DL in a stage when the display driver circuit writes the data signal Data into the data line DL, and the data signal Data is a set value of the data signal Data on the data line DL. Before the data signal Data is written into the data line DL, the display driver circuit has already determined the voltage value of the data signal Data that needs to be written into the data line DL in this stage.

The voltage difference refers to the difference between the voltage values of the data signals Data that need to be written into the same data line DL in two adjacent stages.

Referring to FIGS. 1, 2, and 4, before a frame is displayed, the display driver circuit may acquire the voltage values of the data signals Data that need to be written into the gates of the drive transistors M3 in the multiple pixels P arranged in an array, that is, acquire the voltage values of the data signals Data that need to be written into the data lines DL in different stages for the display panel to display the frame. Alternatively, before pixels P in one row are displayed, the display driver circuit may acquire the voltages of the data signals Data that need to be written into the gates of the drive transistors M3 of the pixels P in this row for the display panel to display the pixels P in this row, that is, the display driver circuit acquires the voltage values of the data signals Data that need to be written into the data lines DL before the data write stage of the pixels P in this row. Therefore, the difference between the voltage values of the data signals Data that need to be written into the same data line DL in two adjacent stages may be calculated according to the voltage values of the data signals Data that need to be written into each data line DL in different stages. Alternatively, the difference between the voltage values of the data signals Data that need to be written into the same data line DL in the current stage and the previous stage may be calculated according to the voltage value of the data signal Data that needs to be written into each data line DL before the data write stage of pixels Pin this row and the voltage value of the data signal Data that needs to be written into each data line DL before the data write stage of pixels P in the previous row.

In S102, a charge current of each data line is determined according to the voltage difference.

The voltage difference includes the difference between the voltage values of the data signals Data that need to be written into the first data line DL in two adjacent stages, the difference between the voltage values of the data signals Data that need to be written into the second data line DL in two adjacent stages, . . . and the difference between the voltage values of the data signals Data that need to be written into the last data line DL in two adjacent stages.

The charge current refers to the current when the display driver circuit writes the data signal Data into the data line DL. The greater the charge current is, the faster the data signal Data on the data line DL changes until the data signal Data reaches the set value that needs to be written.

For example, before a frame is displayed, multiple voltage differences of each data line DL in multiple pairs of two adjacent stages may be obtained. According to the multiple voltage differences of each data line DL, whether the frame is overloaded may be determined, that is, the change amplitude of the voltage values of the data signals Data that need to be written into each data line DL in different stages of the frame may be determined. In this frame, when the change amplitude of the voltage values of the data signals Data that need to be written into each data line DL is relatively large, the charge current of each data line DL in each stage of this frame may be set to a relatively large value, that is, the charge currents when the display driver circuit writes the data signals Data into each data line DL in multiple stages of this frame are set to relatively large values. Alternatively, the charge currents of only part of the data lines DL with relatively large change amplitudes may be set to relatively large values, that is, the charge currents when the display driver circuit writes the data signals Data into the part of the data lines DL with voltage values of relatively large change amplitudes in multiple stages of this frame are set to relatively large values.

Before pixels P in one row are displayed, the voltage difference of each data line DL in two adjacent stages before the data write stage of the pixels P in this one row and before the data write stage of the pixels P in the previous row may be obtained. According to the voltage difference of each data line DL, whether the pixels P in this row are overloaded may be determined, that is, the change amplitude of the voltage values of the data signals Data that need to be written into each data line DL of the pixels P in this row in the current stage and the previous stage may be determined. In the pixels P of this row, when the change amplitude of the voltage value of the data signal Data on each data line DL is relatively large, the charge current of each data line DL in the current stage may be set to a relatively large value, that is, the charge currents when the display driver circuit writes the data signals Data into the data lines DL in the current stage are set to relatively large values. Alternatively, the charge currents of only part of the data lines DL with relatively large change amplitudes may be set to relatively large values, that is, the charge currents when the display driver circuit writes data signals Data into the part of the data lines DL with relatively large change amplitudes of the voltage values in the current stage are set to relatively large values.

In S103, a data signal is provided for each data line with the charge current.

In different frames or different rows of pixels P, the display driver circuit may write the data signals Data into the data lines DL with different charge currents, and then pixels P in one row may write the data signals Data on the data lines DL into the gates of the drive transistors M3. According to the overloading conditions of different frames, the display driver circuit may write the data signals Data into all the data lines DL or some of the data lines DL with relatively large charge currents in multiple stages of one or more overloaded frames. Alternatively, according to the overloading conditions of pixels P in different rows, the display driver circuit may write the data signals Data into all the data lines DL or some of the data lines DL with relatively large charge currents before the data write stage of pixels P in one or more overloaded rows.

Figure 5:
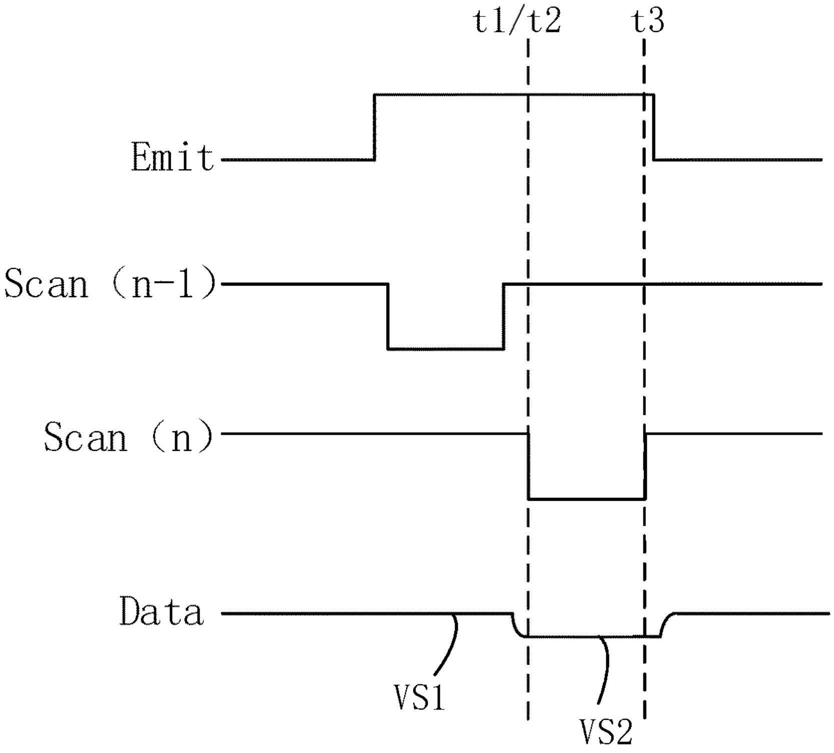
FIG. 5 is a drive timing diagram of a pixel according to an embodiment of the present disclosure.
Figure 6:
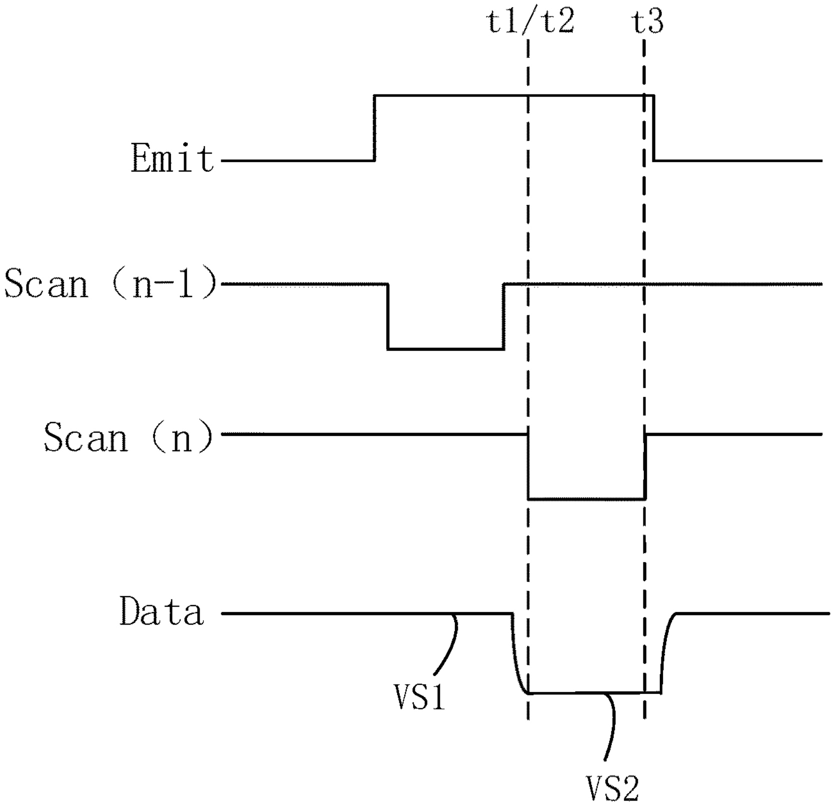
FIG. 6 is another drive timing diagram of a pixel according to an embodiment of the present disclosure.

For example, FIG. 5 is a drive timing diagram of a pixel according to an embodiment of the present disclosure, and FIG. 6 is another drive timing diagram of a pixel according to an embodiment of the present disclosure. When the voltage VS2 of the data signal Data that needs to be written into a pixel P of the current row in a column is slightly different from the voltage VS1 of the data signal Data that needs to be written into a pixel P of the previous row in the same column, as shown in FIG. 5, the change amplitude of the voltage values of the data signals Data that need to be written into the data line DL is relatively small, and the charge current does not need to be set to a relatively large value. Even if the display driver circuit writes the data signal Data into the data line DL with a relatively small charge current, the voltage of the data signal Data on the data line DL can change from the voltage VS1 to the voltage VS2 in a short period of time. Before the moment t1 when the pixel P in the current row starts to write the data signal Data on the data line DL electrically connected to the pixels P in this column into the gate of the drive transistor M3, that is, before the moment t1 when the data write transistor M2 is turned on, the data signal Data may reach a stable state.

When the voltage VS2 of the data signal Data that needs to be written into a pixel P of the current row in a column is greatly different from the voltage VS1 of the data signal Data that needs to be written into a pixel P of the previous row in the same column, as shown in FIG. 6, the change amplitude of the voltage values of the data signals Data that need to be written into the data line DL is relatively large, and the charge current may be configured to be relatively large so that the display driver circuit can write the data signal Data into the data line DL with a relatively large charge current. Even if the change amplitude of the voltage values of the data signals Data on the data line DL is relatively large, the voltage of the data signal Data on the data line DL can change from the voltage VS1 to the voltage VS2 in a short period of time. Before the moment t1 when the pixel P in the current row starts to write the data signal Data on the data line DL electrically connected to the pixels P in this column into the gate of the drive transistor M3, that is, before the moment t1 when the data write transistor M2 is turned on, the data signal Data may reach a stable state. Alternatively, when the data signal Data on the data line DL tends to be stable, the conduction time of the data write transistor M2 of the pixel P in the current row may be effectively reduced so that the time for the data signal Data being written into the gate of the drive transistor M3 can be increased, the voltage at the gate of the drive transistor M3 can be equal to the voltage VS2 of the data signal Data when the light-emitting element (OLED) emits light, improving the display accuracy.

In the embodiments of the present disclosure, the voltage difference between the data signals provided for each data line in two adjacent stages is acquired, and the charge current of each data line may be determined according to the voltage difference so that the display driver circuit can write the data signal into each data line with the charge current determined by the voltage difference, the voltage value of the data signal on the data line can reach the required set value in a short period of time, the time for the data signal being written into the gate of the drive transistor can be increased, the voltage at the gate of the drive transistor can be equal to the voltage of the data signal when the light-emitting element emits light, and the display accuracy can be improved.

In addition, in different frames or different rows of pixels, the voltage difference between the data signals provided for each data line in two adjacent stages changes dynamically, and the charge current of each data line can be dynamically adjusted according to the overloading conditions of different frames or different rows of pixels, thereby addressing the increased power consumption and increased heat generation due to the uniform increase in the charge currents of all the data lines in the data signal write stage in the related art.

In an embodiment, determining the charge current of each data line according to the voltage difference includes acquiring a mapping relationship between the voltage difference and the charge current on each data line; and determining the charge current of each data line based on the mapping relationship and the voltage difference.

For example, the mapping relationship between the voltage difference ΔV and the charge current I may be shown in Table 1. When the absolute value |ΔV| of the voltage difference ΔV between the data signals provided for the data line in two adjacent stages is located within a first range from 0 to ΔV1, the charge current of the data line may be determined to be I(i) according to the mapping relationship; when the absolute value |ΔV| of the voltage difference ΔV between the data signals provided for the data line in two adjacent stages is located within a second range from ΔV1 to ΔV2, the charge current of the data line may be determined to be I(i+1) according to the mapping relationship; when the absolute value |ΔV| of the voltage difference ΔV between the data signals provided for the data line in two adjacent stages is located within a third range from ΔV2 to ΔV3, the charge current of the data line may be determined to be I(i+2) according to the mapping relationship; . . . when the absolute value |ΔV| of the voltage difference ΔV between the data signals provided for the data line in two adjacent stages is located within a $j^{th}$ range from ΔV(j−1) to ΔV(j), the charge current of the data line may be determined to be I(i+j−1) according to the mapping relationship; and when the absolute value |ΔV| of the voltage difference ΔV between the data signals provided for the data line in two adjacent stages is located within a (j+1)th range from ΔV(j) to ΔV(max), the charge current of the data line may be determined to be I(i+j) according to the mapping relationship, where ΔV(max) denotes the absolute value of the difference between the set value of the data signal Data corresponding to the maximum grayscale of the light-emitting element (OLED) and the set value of the data signal Data corresponding to the minimum grayscale of the light-emitting element (OLED).

TABLE 1

Mapping relationship between the voltage difference ΔV and the charge current I

| Absolute value \|ΔV\| of the voltage difference ΔV | Charge current I |
|---|---|
| 0 to ΔV1 | I(i) |
| ΔV1 to ΔV2 | I(i + 1) |
| ΔV2 to ΔV3 | I(i + 2) |
| . . . | . . . |
| ΔV(j − 1) to ΔV(j) | I(i + j − 1) |
| ΔV(j) to ΔV(max) | I(i + j) |

When the absolute value |ΔV| of the voltage difference ΔV between the data signals Data provided for the data line DL in two adjacent stages is located within a different range, the smaller the absolute value |ΔV| of the voltage difference ΔV, the smaller the charge current I of the data line DL; and the larger the absolute value |ΔV| of the voltage difference ΔV, the larger the charge current I of the data line DL. In this manner, while the time for the data signal Data being written into the gate of the drive transistor M3 can be increased to improve the display accuracy, the charge current of the data line DL can be adaptively adjusted to reduce the power consumption of the display panel.

In an embodiment, when the absolute value |ΔV| of the voltage difference ΔV is greater than or equal to a first threshold, the charge current I is greater than or equal to the minimum charge current of the multiple data lines DL in the display panel.

The minimum charge current refers to the charge current of the multiple data lines DL when a frame or a row of pixels P are lightly loaded, that is, when the change amplitude of the voltage value of the data signal Data that needs to be written into the data line DL is relatively small, and the minimum charge current is also the non-uniformly-increased charge current of the data lines DL in an existing display panel before the driving method for a display panel provided in the embodiments of the present disclosure is performed. In an embodiment, the first threshold is ΔV1, and the minimum charge current of the data line DL is I(i). When the display panel is working, the charge currents of all the data lines DL in all stages are greater than or equal to I(i). In this manner, the normal operation of the display panel can be ensured and the following case can be prevented: the display driver circuit cannot effectively write the set value of the data signal Data into a data line DL due to a too-small charge current I of the data line DL.

In an embodiment, one frame includes multiple stages, that is, multiple stages in which the display driver circuit writes the data signals Data into the data lines DL. In each stage, the display driver circuit may write the data signals Data into all the data lines DL simultaneously. In one frame, the display driver circuit needs to write the data signals Data into all the data lines DL multiple times.

Figure 7:
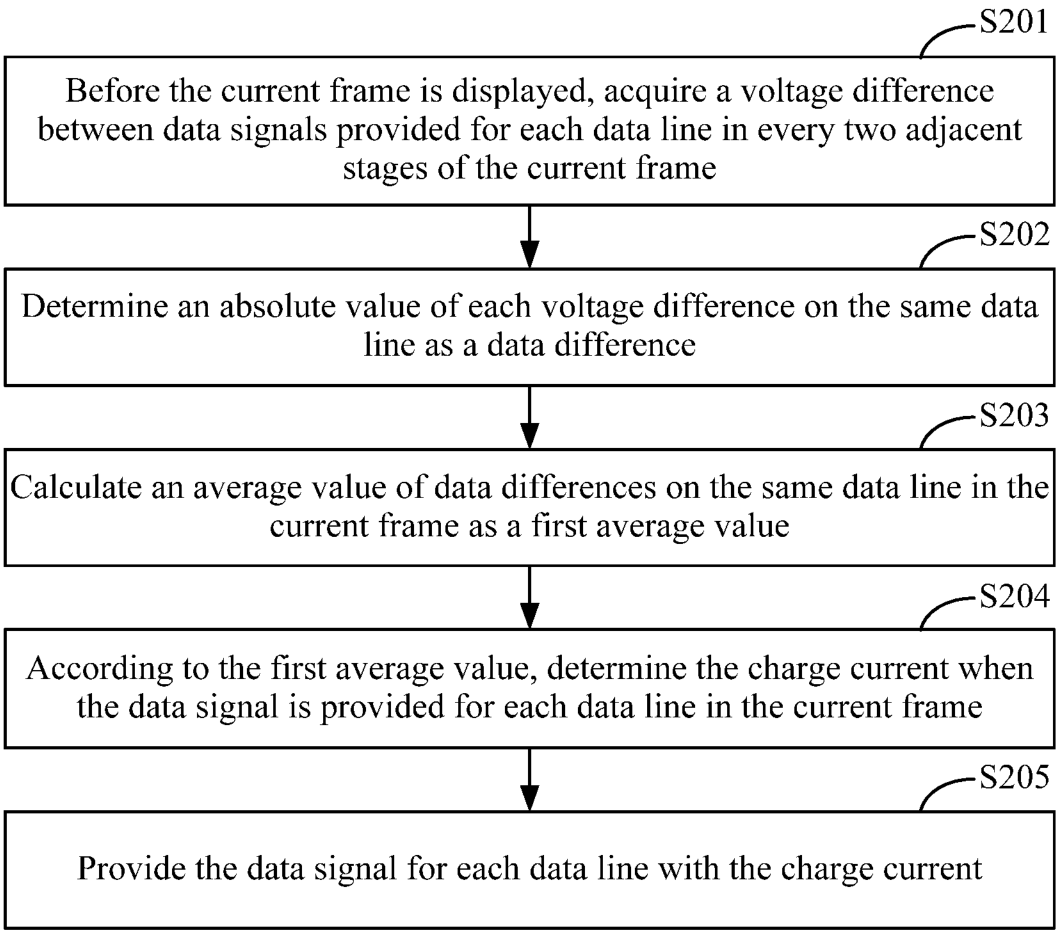
FIG. 7 is a flowchart of another driving method for a display panel according to an embodiment of the present disclosure.

In an embodiment, FIG. 7 is a flowchart of another driving method for a display panel according to an embodiment of the present disclosure. Referring to FIG. 7, the driving method includes the steps described below.

In S201, before the current frame is displayed, a voltage difference between data signals provided for each data line in every two adjacent stages of the current frame is acquired.

The current frame includes multiple row scan stages. In each row scan stage, the data signals Data on all the data lines DL are written into the gates of the drive transistors M3 of pixels P in the same row. Before each row scan stage, the display driver circuit writes the corresponding voltage values of the data signals Data into the data lines DL. Each data line DL includes multiple voltage differences of two adjacent stages.

In S202, an absolute value of each voltage difference on the same data line is determined as a data difference.

In S203, an average value of all data differences of the same data line in the current frame is calculated as a first average value.

In S204, for each data line, the charge current when the data signal is provided for a data line in the current frame is determined according to the first average value of the data line.

According to the first average value, the overloading condition of each data line DL in the current frame may be determined, that is, the change amplitude of the voltage values of the data signals Data that need to be written into each data line DL in different stages in the current frame may be determined.

In an embodiment, the charge current on each data line DL in the current frame is positively correlated to the first average value of the respective data line DL. That is, in the current frame, the charge currents of the data lines DL may be different. The greater the first average value of a data line DL is, the larger the change amplitude of the voltage values of the data signals Data that need to be written into the data line DL in different stages in the current frame is, the larger the charge currents when the display driver circuit writes the data signals Data into the data line DL in multiple stages in the current frame are. In this manner, the speed at which the display driver circuit writes the data signal Data into a data line DL on which the change amplitude of the voltage values of the data signals Data is relatively large in multiple stages of the frame can be increased, the time for the data signal Data being written into the data line DL can be reduced, thus the time for the data signal Data being written into the gate of the drive transistor M3 can be increased, and the display accuracy of the overloaded one or more columns can be improved.

In S205, the data signal is provided for each data line with the charge current.

For example, according to the overloading conditions of different data lines DL, in multiple stages of the current frame, the display driver circuit may write the data signal Data into an overloaded data line DL with a larger charge current and write the data signal Data into a lightly loaded data line DL with a smaller charge current.

It is to be noted that when the display driver circuit writes the data signal Data into the lightly loaded data line DL with a smaller charge current in multiple stages in the current frame, the charge current should be greater than or equal to the minimum charge current of the data lines DL in the display panel, thereby ensuring the normal operation of the display panel and preventing the case that the display driver circuit cannot effectively write the set value of the data signal Data into a data line DL due to a too small charge current of the data line DL.

It is to be understood that in different frames, when the overloading condition of a data line DL changes, the charge current of the data line DL may change accordingly.

In the embodiments of the present disclosure, before the current frame is displayed, the voltage difference between the data signals provided for each data line in every two adjacent stages of the current frame is acquired, and the average value of the absolute values of all voltage differences on the same data line is calculated. In this manner, the overloading conditions of the data lines in the current frame may be determined, and the charge current of each data line is adaptively adjusted according to the overloading condition of the respective data line so that the voltage value of the data signal on each data line can reach the required set value in a short period of time, the time for the data signals of pixels in each column to be written into the gates of the drive transistors can be increased, and the display accuracy can be improved.

In addition, the overloading conditions of the data lines may be different in different frames or the same frame, the charge current of each data line may be dynamically adjusted, thereby addressing the increased power consumption and increased heat generation due to the uniform increase in the charge currents of all the data lines in all the data signal write stage in the related art.

Figure 8:
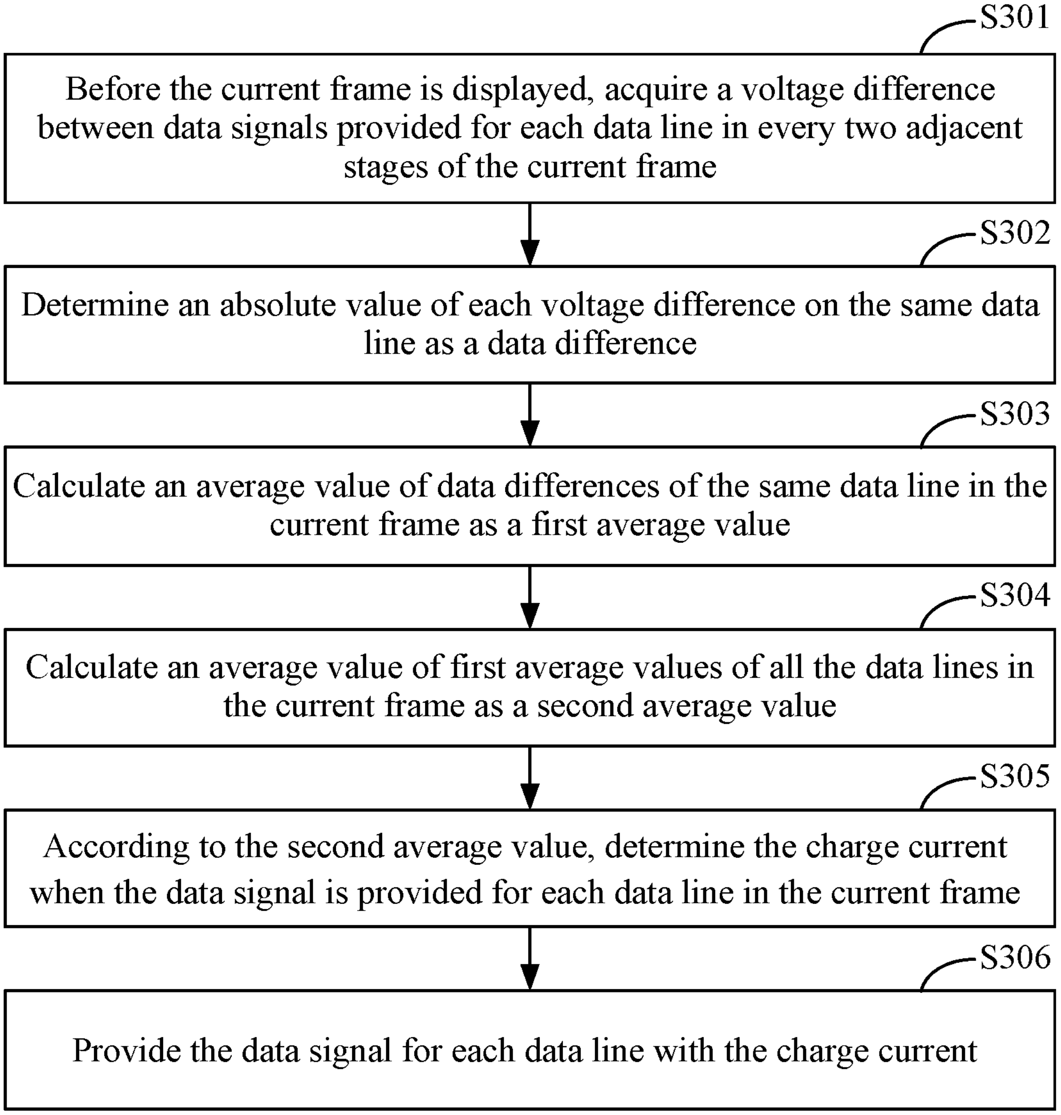
FIG. 8 is a flowchart of another driving method for a display panel according to an embodiment of the present disclosure.

In another embodiment, FIG. 8 is a flowchart of another driving method for a display panel according to an embodiment of the present disclosure. Referring to FIG. 8, the driving method includes the steps described below.

In S301, before the current frame is displayed, the voltage difference between data signals provided for each data line in every two adjacent stages of the current frame is acquired.

In S302, an absolute value of each voltage difference on the same data line is determined as a data difference.

In S303, an average value of all data differences on the same data line in the current frame is calculated as a first average value.

In S304, an average value of first average values of all the data lines in the current frame is calculated as a second average value.

In S305, the charge current when the data signal is provided for each data line in the current frame is determined according to the second average value.

According to the second average value, the overloading condition of the current frame may be determined, that is, the average change amplitude of the voltage values of the data signals Data that need to be written into all the data lines DL in different stages in the current frame may be determined.

In an embodiment, the charge current on each data line DL in the current frame is positively correlated to the second average value, that is, the charge currents on the data lines DL are the same in the current frame, and the charge current of each data line DL increases as the second average value increases in the current frame. In this manner, the speed at which the display driver circuit writes the data signals Data into all the data lines DL in an overloaded frame can be increased, the time for the data signal Data to be written into the data line DL can be reduced, so that the time for the data signal Data to be written into the gate of the drive transistor M3 can be increased and the display accuracy of this frame can be improved.

In S306, the data signal is provided for the data line with the charge current.

For example, if the second average value is relatively large, the current frame is overloaded, and the display driver circuit may write the data signals Data into all the data lines DL with a relatively large charge current in multiple stages of the current frame; and if the second average value is relatively small, the current frame is lightly loaded, and the display driver circuit may write the data signals Data into all the data lines DL with a relatively small charge current in multiple stages of the current frame.

It is to be noted that when the display driver circuit writes the data signals Data into all the data lines DL with a relatively small charge current in multiple stages of the current frame, the charge current should be greater than or equal to the minimum charge current of the data lines DL in the display panel, thereby ensuring the normal operation of the display panel and preventing the case that the display driver circuit cannot effectively write the set value of the data signal Data into a data line DL due to a too small charge current of the data line DL.

It is to be understood that in different frames, when the overloading condition of the current frame changes, the charge current of all the data lines DL may change accordingly.

In the embodiments of the present disclosure, before the current frame is displayed, the voltage difference between the data signals provided for each data line in every two adjacent stages of the current frame is acquired, and the average value of the absolute values of all voltage differences on all the data lines is calculated. In this manner, the overloading condition of the current frame may be determined, and the charge currents of all the data lines are adaptively adjusted according to the overloading condition of the current frame so that the voltage values of the data signals of all the data lines in the current frame can reach the required set value in a short period of time, the time for the data signal of the pixel being written into the gate of the drive transistor can be increased, and the display accuracy can be improved. When the overloading conditions of different frames are different, the charge currents of all the data lines can be dynamically adjusted, thereby addressing the increased power consumption and increased heat generation caused by the uniform increase in the charge currents of all the data lines in the data signal write stage in the related art.

In addition, the display driver circuit may provide the data signals for all the data lines with the same charge current in the same frame, thereby reducing the amount of calculation in the process of determining the charge current when the data signals are provided for the data lines in the current frame, which is conducive to simplifying the driving method for a display panel.

In an embodiment, each stage corresponds to refreshing the data signals of one row of pixels, and each stage is a stage in which the display driver circuit writes the data signals Data into the data lines DL. After each stage, the data write transistors M2 in one row of pixels are turned on, and the data signals Data on the data lines DL are written into the gates of the drive transistors M3 in this row of pixels.

Figure 9:
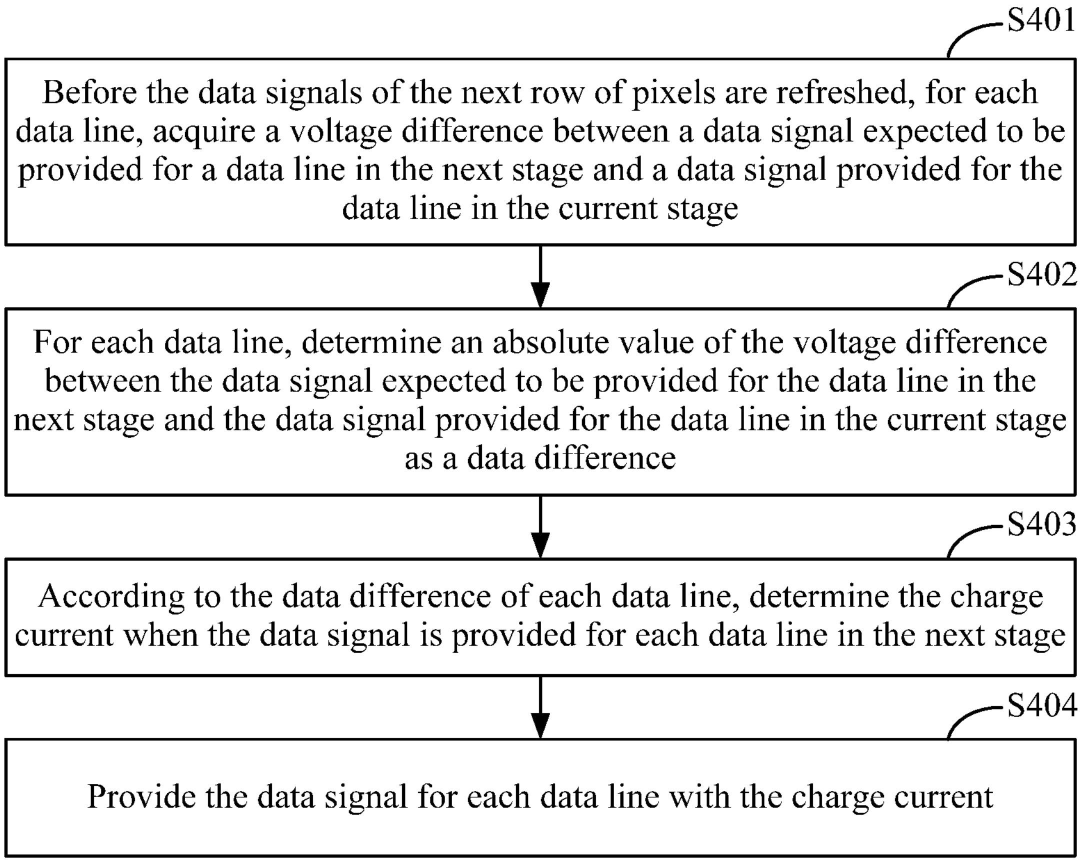
FIG. 9 is a flowchart of another driving method for a display panel according to an embodiment of the present disclosure.

In an embodiment, FIG. 9 is a flowchart of another driving method for a display panel according to an embodiment of the present disclosure. Referring to FIG. 9, the driving method includes the steps described below.

In S401, before the data signals of pixels in the next row are refreshed, the voltage difference between a data signal expected to be provided for a data line in the next stage and a data signal provided for the data line in the current stage is acquired for each data line.

The current stage corresponds to refreshing the data signals Data of pixels P in the current row, and the next stage corresponds to refreshing the data signals Data of pixels P in the next row.

When the data signals Data of pixels P in the next row are refreshed, the data signals Data on the data lines DL are written into the gates of the drive transistors M3 of pixels P in the next row. Before that, the display driver circuit needs to write the voltage values of the corresponding data signals Data into the data lines DL. Before the display driver circuit writes the voltage values of the corresponding data signals Data into the data lines DL, the voltage difference between the data signal Data expected to be written by the display driver circuit into the data line DL in the next stage and the data signal Data to be written by the display driver circuit into the data line DL in the current stage is acquired first, and each data line DL includes one voltage difference of two adjacent stages, that is, the difference between the voltage value of the data signal Data that needs to be written into the data line DL in the current stage and the voltage value of the data signal Data that needs to be written into the data line DL in the next stage.

In S402, for each data line, an absolute value of a voltage difference between a data signal expected to be provided for a data line in the next stage and a data signal provided for the data line in the current stage is determined as a data difference.

In S403, for each data line, the charge current when the data signal is provided for a data line in the next stage is determined according to the data difference of the data line.

According to the data difference of each data line DL, the overloading condition of each data line DL in the next row of pixels P may be determined, that is, the change amplitude of the voltage value of the data signal Data that needs to be written into each data line DL of the next row of pixels Pin the next stage may be determined.

In an embodiment, for each data line, the charge current on a data line DL is positively correlated to the data difference of the data line DL in the next stage. That is, in the next stage, the charge currents of the data lines DL may be different. The larger the absolute value of the voltage difference between the data signal expected to be provided for a data line DL in the next stage and the data signal provided for the data line DL in the current stage is, the larger the change amplitude of the voltage value of the data signal Data that needs to be written into the data line DL in the next stage is, the larger the charge current when the display driver circuit writes the data signal Data into the data line DL in the next stage is. In this manner, the speed at which the display driver circuit writes the data signal Data into a data line DL on which the change amplitude of the voltage value of the data signal Data is relatively large in the next stage can be increased, the time for the data signal Data being written into the data line DL can be reduced, thus the time for the data signal Data being written into the gate of the drive transistor M3 can be increased, and the display accuracy of one or more overloaded pixels P can be improved.

In S404, for each data line, the data signal is provided for a data line with the charge current of the data line.

For example, according to the change amplitudes of the voltage values of the data signals Data that need to be written into different data lines DL in the next stage, for a data line DL on which the change amplitude of the voltage value of the data signal Data to be written in the next stage is relatively large, the display driver circuit may write the data signal Data into the data line DL with a larger charge current in the next stage, while for a data line DL on which the change amplitude of the voltage value of the data signal Data to be written in the next stage is relatively small, the display driver circuit may write the data signal Data into the data line DL with a smaller charge current in the next stage.

It is to be noted that, for the data line DL on which the change amplitude of the voltage value of the data signal Data to be written in the next stage is relatively small, the display driver circuit writes the data signal Data into the data line DL with the smaller charge current in the next stage, the charge current should be greater than or equal to the minimum charge current of the data lines DL in the display panel, thereby ensuring the normal operation of the display panel and preventing the case that the display driver circuit cannot effectively write the set value of the data signal Data into the data line DL due a too small charge current of the data line DL.

It is to be understood that in different stages, when the change amplitude of the voltage value of the data signal Data to be written into a data line DL changes, the charge current of the data line DL may change accordingly.

In the embodiments of the present disclosure, before the data signals of the next row of pixels are refreshed, the voltage difference between the data signal expected to be provided for a data line in the next stage and the data signal provided for the data line in the current stage is acquired for each data line. In this manner, the change amplitude of the voltage value of the data signal to be written into each data line in the next stage may be determined, and the charge current of each data line is adaptively adjusted according to the change amplitude of the voltage value of the respective data line in the next stage so that before the data signals of the next row of pixels are refreshed, the voltage value of the data signal of each data line can reach the required set value in a short period of time, the time for the data signal of each pixel being written into the gate of the drive transistor can be increased, and the display accuracy of the next row of pixels can be improved.

In addition, the change amplitudes of the voltage values of the data signals to be written may be different in different stages, and the charge currents of the data lines may be dynamically adjusted, thereby addressing the increased power consumption and increased heat generation caused by the uniform increase in the charge currents of all the data lines in the data signal write stages.

Figure 10:
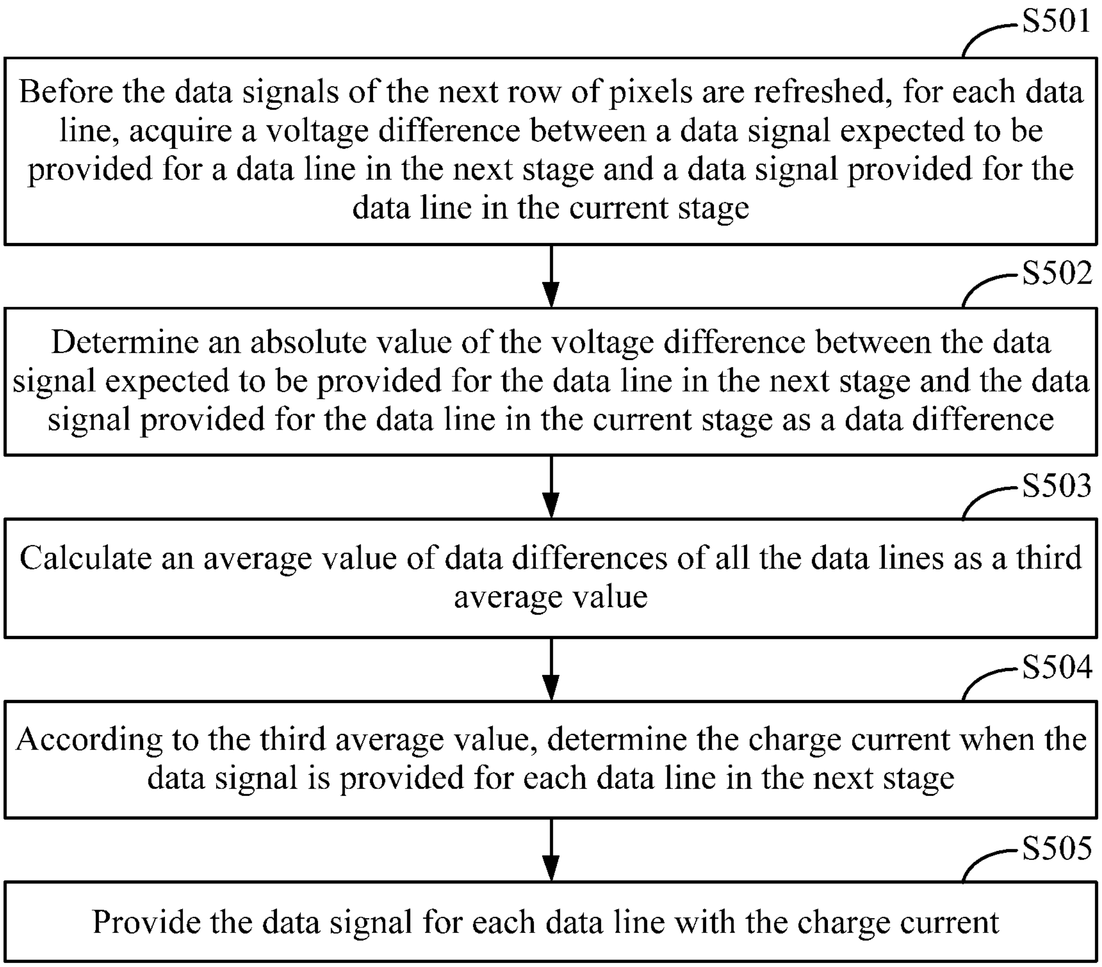
FIG. 10 is a flowchart of another driving method for a display panel according to an embodiment of the present disclosure.

In another embodiment, FIG. 10 is a flowchart of another driving method for a display panel according to an embodiment of the present disclosure. Referring to FIG. 10, the driving method includes the steps described below.

In S501, before the data signals of the next row of pixels are refreshed, the voltage difference between a data signal expected to be provided for a data line in the next stage and a data signal provided for the data line in the current stage is acquired for each data line.

In S502, for each data line, an absolute value of the voltage difference between a data signal expected to be provided for a data line in the next stage and the data signal provided for the data line in the current stage is determined as a data difference.

In S503, an average value of data differences of all the data lines is calculated as a third average value.

In S504, the charge current when the data signal is provided for each data line in the next stage is determined according to the third average value.

According to the third average value, the overloading condition of the next row of pixels P may be determined, that is, the average change amplitude of the voltage values of the data signals Data that need to be written into all the data lines DL of the next row of pixels P in the next stage may be determined.

In an embodiment, the charge current on each data line is positively correlated to the third average value in the next stage, that is, the charge currents on the data lines DL are the same in the next stage, and the charge current of each data line DL increases as the third average value increases in the next stage. In this manner, the speed at which the display driver circuit writes the data signals Data into all the data lines DL before the data signals Data are written into an overloaded row of pixels P can be increased, the time for the data signals Data being written into the data lines DL can be reduced, so as to increase the time for the data signals Data being written into the gates of the drive transistors M3 in the overloaded row of pixels P, and also improve the display accuracy of this row of pixels P.

In S505, the data signal is provided for each data line with the charge current.

For example, if the third average value is relatively large and pixels P in the next row are overloaded, the display driver circuit may write the data signals Data into all the data lines DL with a larger charge current in the next stage; if the third average value is relatively small and the next row of pixels P are lightly loaded, the display driver circuit may write the data signals Data into all the data lines DL with a smaller charge current in the next stage.

It is to be noted that when the display driver circuit writes the data signals Data into all the data lines DL with the smaller charge current in the next stage, the charge current should be greater than or equal to the minimum charge current of the data lines DL in the display panel, thereby ensuring the normal operation of the display panel and preventing the case that the display driver circuit cannot effectively write the set value of the data signal Data into a data line DL due to a too small charge current of the data line DL.

It is to be understood that when the overloading conditions of different rows of pixels P change, the charge currents of all the data lines DL may change accordingly.

In the embodiments of the present disclosure, before the data signals of the next row of pixels are refreshed, the voltage difference between the data signal expected to be provided for a data line in the next stage and the data signal provided for the data line in the current stage is acquired for each data line, and the average value of the absolute values of voltage differences on all the data lines is calculated. In this manner, the overloading condition of the next row of pixels may be determined, and the charge currents of all the data lines are adaptively adjusted according to the overloading condition of the next row of pixels so that before the data signals of the next row of pixels are refreshed, the voltage values of the data signals of all the data lines can reach the required set value in a short period of time, the time for the data signals of the next row of pixels to be written into the gates of the drive transistors can be increased, and the display accuracy of the next row of pixels can be improved. When the overloading conditions of different rows of pixels are different, the charge currents of all the data lines in the corresponding stages may be dynamically adjusted, thereby addressing the increased power consumption and increased heat generation due to the uniform increase in the charge current of all the data lines in the data signal write stages in the related art.

In addition, before the data signals of pixels in the same row are refreshed, the display driver circuit may provide the data signals for all the data lines with the same charge current, thereby reducing the amount of calculation in the process of determining the charge currents when the data signals are provided for the data lines in the next stage, which is conducive to simplifying the driving method for a display panel.

Based on the same inventive concept, the embodiments of the present disclosure further provide a driving device for a display panel. The display panel in FIG. 1 is used as an example. The display panel includes multiple pixels P arranged in an array and multiple data lines DL. Pixels P located in the same column are electrically connected to the same data line DL. The data lines DL are configured to provide the data signals Data for the multiple pixels P in stages. The driving device for a display panel provided in the embodiments of the present disclosure can drive the display panel shown in FIG. 1. The similarities between the embodiment of the present disclosure and the related art are not repeated, and only the differences are described.

It is to be noted that FIG. 1 merely shows an exemplary display panel that can be driven by the driving device for a display panel provided in the embodiments of the present disclosure. The driving device for a display panel provided in the embodiments of the present disclosure can also drive display panels of other structures, which are not limited to the embodiments of the present disclosure.

Figure 11:
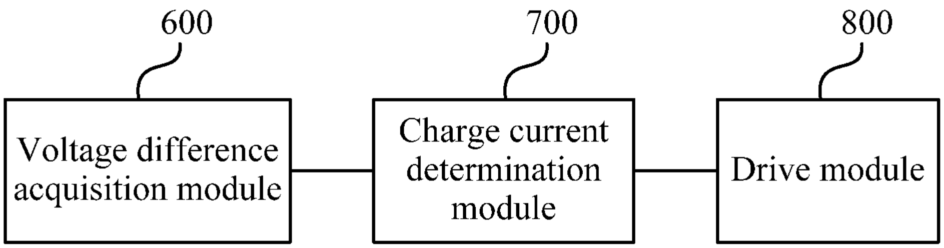
FIG. 11 is a structural diagram of a driving device for a display panel according to an embodiment of the present disclosure.

FIG. 11 is a structural diagram of a driving device for a display panel according to an embodiment of the present disclosure. Referring to FIG. 11, the driving device includes a voltage difference acquisition module 600, a charge current determination module 700, and a drive module 800.

The voltage difference acquisition module 600 is configured to acquire a voltage difference between data signals provided for each data line in two adjacent stages.

The charge current determination module 700 is configured to determine a charge current of each data line according to the voltage difference.

The drive module 800 is configured to provide a data signal for each data line with the charge current.

In the embodiments of the present disclosure, the voltage difference acquisition module acquires the voltage difference between the data signals provided for each data line in two adjacent stages, and the charge current determination module and the drive module determine the charge current of each data line according to the voltage difference so that when the display driver circuit writes the data signal into each data line with the charge current determined by the voltage difference, the voltage value of the data signal of each data line can reach the required set value in a short period of time so that the time for the data signal to be written into the gate of the drive transistor can be increased. When the light-emitting element emits light, the voltage at the gate of the drive transistor can be equal to the voltage of the data signal, and the display accuracy can be improved.

In addition, in different frames or different rows of pixels, the voltage difference between the data signals provided for each data line in two adjacent stages changes dynamically, the voltage difference acquisition module may acquire the changing voltage difference in real time, and the charge current determination module may dynamically adjust the charge current of the data line according to the overloading conditions of different frames or different rows of pixels, thereby addressing the increased power consumption and increased heat generation due to the uniform increase in the charge currents of all the data lines in the data signal write stage in the related art.

Figure 12:
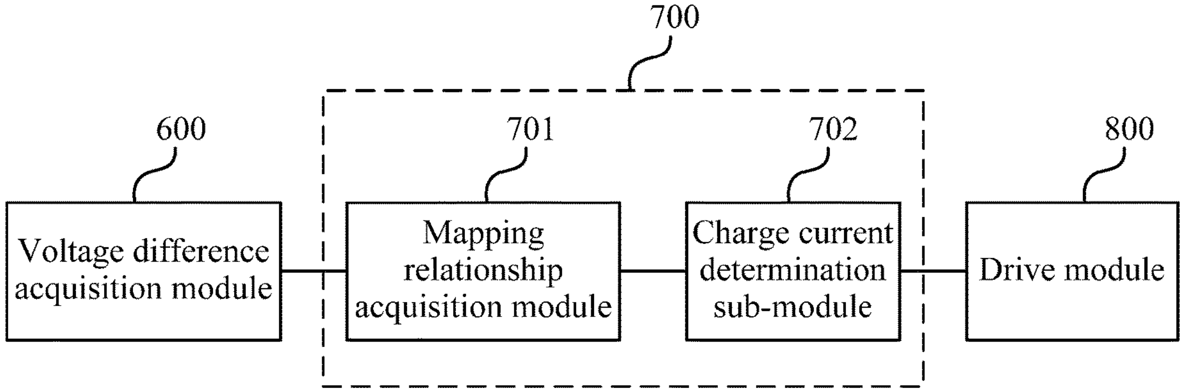
FIG. 12 is a structural diagram of another driving device for a display panel according to an embodiment of the present disclosure.

In an embodiment, FIG. 12 is a structural diagram of another driving device for a display panel according to an embodiment of the present disclosure. Referring to FIG. 12, the charge current determination module 700 includes a mapping relationship acquisition module 701 and a charge current determination sub-module 702.

The mapping relationship acquisition module 701 is configured to acquire a mapping relationship between the voltage difference and the charge current on each data line.

The charge current determination sub-module 702 is configured to determine the charge current of each data line based on the mapping relationship and the voltage difference.

In this manner, while the time for the data signal being written into the gate of the drive transistor can be increased to improve the display accuracy, the charge current of each data line can be adaptively adjusted to reduce the power consumption of the display panel.

In an embodiment, when the absolute value of the voltage difference is greater than or equal to a first threshold, the charge current is greater than or equal to the minimum charge current of the data lines in the display panel. In this manner, the normal operation of the display panel can be ensured and the following case can be prevented: The display driver circuit cannot effectively write the set value of the data signal into a data line due to a too-small charge current of the data line.

Figure 13:
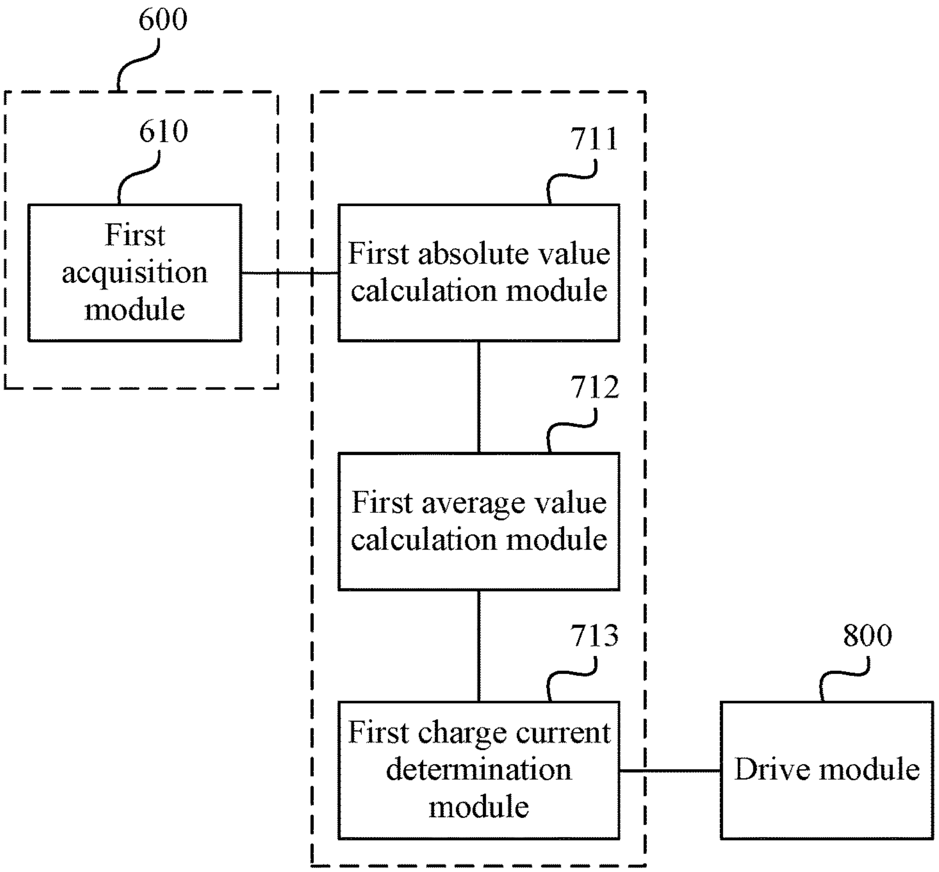
FIG. 13 is a structural diagram of another driving device for a display panel according to an embodiment of the present disclosure.

In an embodiment, one frame includes multiple stages. FIG. 13 is a structural diagram of another driving device for a display panel according to an embodiment of the present disclosure. Referring to FIG. 13, the voltage difference acquisition module 600 includes a first acquisition module 610.

The first acquisition module 610 is configured to, before the current frame is displayed, acquire the voltage difference between data signals provided for each data line in every two adjacent stages of the current frame.

In an embodiment, with continued reference to FIG. 13, the charge current determination module 700 includes a first absolute value calculation module 711, a first average value calculation module 712, and a first charge current determination module 713.

The first absolute value calculation module 711 is configured to determine an absolute value of each voltage difference on the same data line as a data difference.

The first average value calculation module 712 is configured to calculate an average value of all data differences of the same data line in the current frame as a first average value.

The first charge current determination module 713 is configured to, for each data line, determine the charge current when the data signal is provided for a data line in the current frame according to the first average value of the data line.

For each data line, the charge current on a data line in the current frame is positively correlated to the first average value of the data line.

In the embodiments of the present disclosure, before the current frame is displayed, the voltage difference between the data signals provided for each data line in every two adjacent stages of the current frame is acquired through the first acquisition module, the average value of the absolute values of all the voltage differences on the same data line is calculated through the first absolute value calculation module and the first average value calculation module, the overloading conditions of the data lines in the current frame may be determined through the first charge current determination module, and the charge currents of the data lines are adaptively adjusted according to the overloading conditions of the data lines so that the voltage value of the data signal of each data line can reach the required set value in a short period of time, the time for the data signals of pixels in each column to be written into the gates of the drive transistors can be increased, and the display accuracy can be improved. In addition, the overloading conditions of the data lines may be different in different frames or the same frame, the first acquisition module may acquire the changing voltage difference, and the first charge current determination module may dynamically adjust the charge currents of the data lines, thereby addressing the increased power consumption and increased heat generation caused by an uniform increase in the charge currents of all the data lines in the data signal write stages in the related art.

Figure 14:
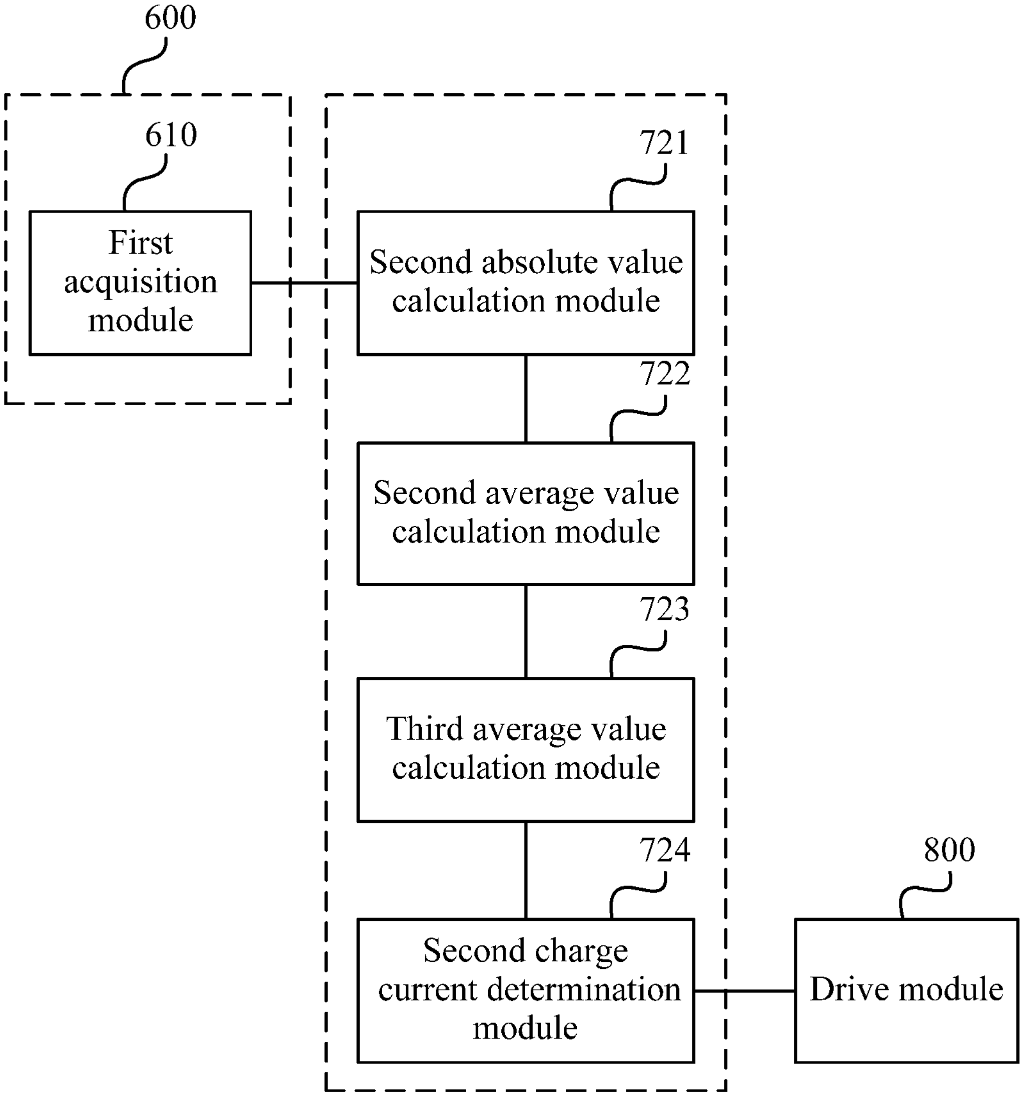
FIG. 14 is a structural diagram of another driving device for a display panel according to an embodiment of the present disclosure.

In an embodiment, FIG. 14 is a structural diagram of another driving device for a display panel according to an embodiment of the present disclosure. Referring to FIG. 14, the charge current determination module 700 includes a second absolute value calculation module 721, a second average value calculation module 722, a third average value calculation module 723, and a second charge current determination module 724.

The second absolute value calculation module 721 is configured to determine an absolute value of each voltage difference on the same data line as a data difference.

The second average value calculation module 722 is configured to calculate an average value of all data differences on the same data line in the current frame as a first average value.

The third average value calculation module 723 is configured to calculate an average value of first average values of all the data lines in the current frame as a second average value.

The second charge current determination module 724 is configured to determine the charge current when the data signal is provided for each data line in the current frame according to the second average value.

The charge current on each data line in the current frame is positively correlated to the second average value.

In the embodiments of the present disclosure, the average value of the absolute values of all the voltage differences on all the data lines is calculated through the second absolute value calculation module, the second average value calculation module, and the third average value calculation module calculate, the overloading condition of the current frame may be determined through the second charge current determination module, and the charge currents of all the data lines can be adaptively adjusted according to the overloading condition of the current frame so that the voltage values of the data signals of all the data lines in the current frame can reach the required set value in a short period of time, the time for the data signal of the pixel being written into the gate of the drive transistor can be increased, and the display accuracy can be improved. When the overloading conditions of different frames are different, the first acquisition module may acquire the changing voltage difference, and the second charge current determination module may dynamically adjust the charge currents of the data lines, thereby addressing the increased power consumption and increased heat generation caused by the uniform increase in the charge current of all the data lines in the data signal write stages in the related art. In addition, the display driver circuit may provide the data signals for all the data lines with the same charge current in the same frame, thereby reducing the amount of calculation in the process of the second charge current determination module determining the charge currents when the data signals are provided for the data lines in the current frame, which is conducive to simplifying the driving device for a display panel and reducing the power consumption of the driving device.

Figure 15:
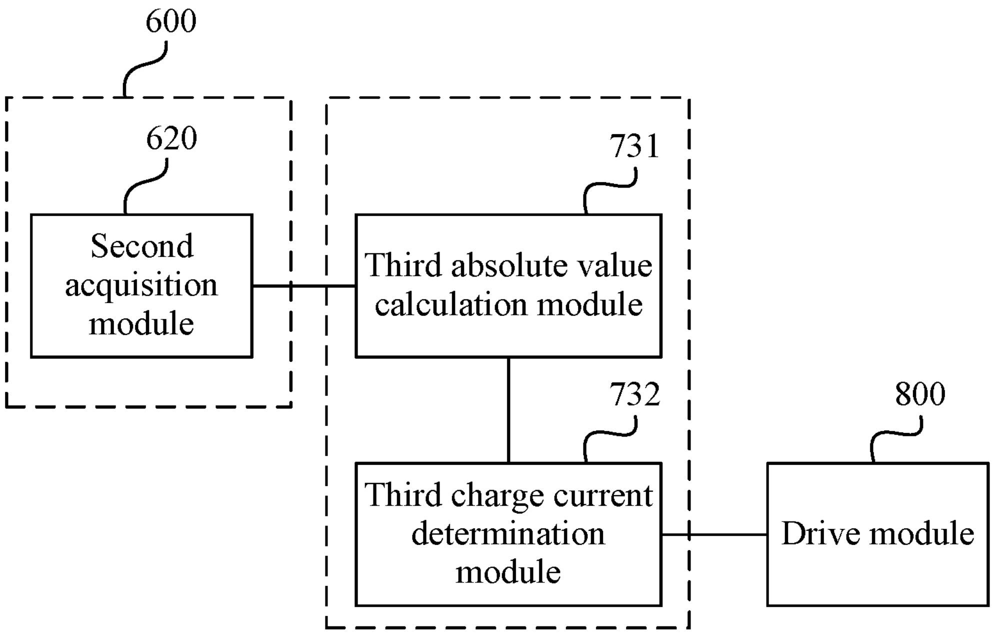
FIG. 15 is a structural diagram of another driving device for a display panel according to an embodiment of the present disclosure.

Each stage corresponds to refreshing the data signals of one row of pixels. FIG. 15 is a structural diagram of another driving device for a display panel according to an embodiment of the present disclosure. Referring to FIG. 15, the voltage difference acquisition module 600 includes a second acquisition module 620.

The second acquisition module 620 is configured to, before the data signals of the next row of pixels are refreshed, for each data line, acquire the voltage difference between a data signal expected to be provided for a data line in the next stage and a data signal provided for the data line in the current stage.

In an embodiment, with continued reference to FIG. 15, the charge current determination module 700 includes a third absolute value calculation module 731 and a third charge current determination module 732.

The third absolute value calculation module 731 is configured to determine, for each data line, an absolute value of a voltage difference between a data signal expected to be provided for a data line in the next stage and a data signal provided for the data line in the current stage as a data difference.

The third charge current determination module 732 is configured to determine, according to the data difference of each data line, the charge current when the data signal is provided for each data line in the next stage.

For each data line, the charge current on a data line is positively correlated to the data difference of the data line in the next stage.

In the embodiments of the present disclosure, before the data signals of the next row of pixels are refreshed, the voltage difference between the data signal expected to be provided for a data line in the next stage and the data signal provided for the data line in the current stage is acquired for each data line through the second acquisition module, the change amplitude of the voltage value of the data signal to be written into each data line in the next stage may be determined through the third absolute value calculation module, and through the third charge current determination module, the charge current of each data line may be adaptively adjusted according to the change amplitude of the voltage value of the data line in the next stage so that before the data signals of the next row of pixels are refreshed, the voltage value of the data signal of each data line can reach the required set value in a short period of time, the time for the data signal of each pixel being written into the gate of the drive transistor can be increased, and the display accuracy of the next row of pixels can be improved. In addition, the change amplitudes of the voltage values of the data signals to be written may be different in different stages, the second acquisition module may acquire the changing voltage difference, and the third charge current determination module may dynamically adjust the charge currents of the data lines, thereby addressing the increased power consumption and increased heat generation caused by the uniform increase in the charge currents of all the data lines in the data signal write stages in the related art.

Figure 16:
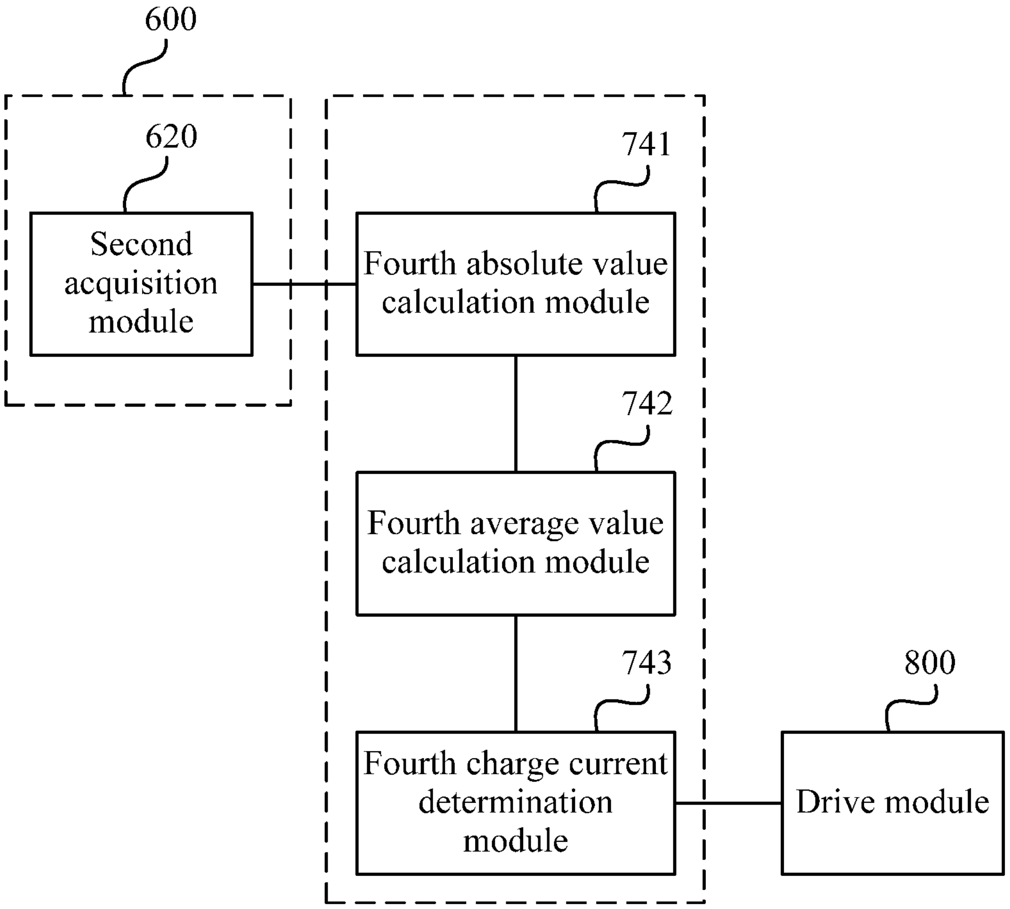
FIG. 16 is a structural diagram of another driving device for a display panel according to an embodiment of the present disclosure.

FIG. 16 is a structural diagram of another driving device for a display panel according to an embodiment of the present disclosure. Referring to FIG. 16, the charge current determination module 700 includes a fourth absolute value calculation module 741, a fourth average value calculation module 742, and a fourth charge current determination module 743.

The fourth absolute value calculation module 741 is configured to determine, for each data line, an absolute value of the voltage difference between a data signal expected to be provided for a data line in the next stage and a data signal provided for the data line in the current stage as a data difference.

The fourth average value calculation module 742 is configured to calculate an average value of data differences of all the data lines as a third average value.

The fourth charge current determination module 743 is configured to determine, according to the third average value, the charge current when the data signal is provided for each data line in the next stage.

In the next stage, the charge current on each data line is positively correlated to the third average value.

In the embodiments of the present disclosure, through the fourth absolute value calculation module and the fourth average value calculation module, the average value of the absolute values of the voltage differences on all the data lines is calculated, and through the fourth charge current determination module, the overloading condition of the next row of pixels may be determined and the charge currents of the data lines are adaptively adjusted according to the overloading condition of the next row of pixels so that before the data signals of the next row of pixels are refreshed, the voltage value of the data signal of each data line can reach the required set value in a short period of time, the time for the data signals of the next row of pixels being written into the gates of the drive transistors can be increased, and the display accuracy of the next row of pixels can be improved. When the overloading conditions of different rows of pixels are different, the second acquisition module may acquire the changing voltage difference, and the fourth charge current determination module may dynamically adjust the charge currents of the data lines, thereby addressing the increased power consumption and increased heat generation caused by the uniform increase in the charge currents of all the data lines in the data signal write stages in the related art. In addition, before the data signals of the pixels in the same row are refreshed, the display driver circuit may provide the data signals for all the data lines with the same charge current, thereby reducing the amount of calculation in the process of the fourth charge current determination module determining the charge currents when the data signals are provided for the data lines in the next stage, which is conducive to simplifying the driving device for a display panel and reducing the power consumption.

Figure 17:
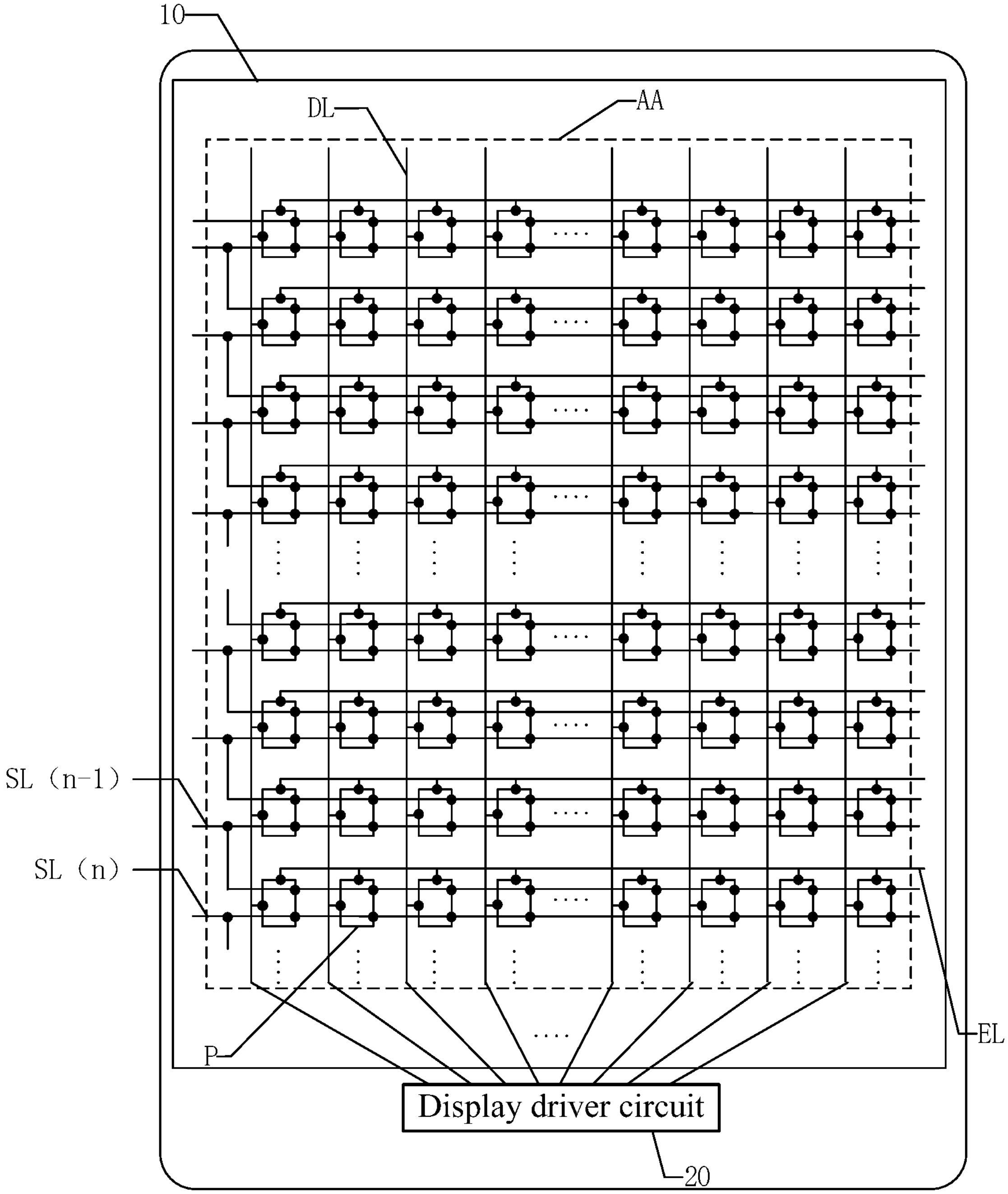
FIG. 17 is a structural diagram of a display device according to an embodiment of the present disclosure.

Based on the same inventive concept, the embodiment of the present disclosure further provides a display device. FIG. 17 is a structural diagram of a display device according to an embodiment of the present disclosure. Referring to FIG. 17, the display device includes a display panel 10 and a display driver circuit 20. The display panel 10 includes multiple pixels P arranged in an array and multiple data lines DL. Pixels P located in the same column are electrically connected to the same data line DL. The data lines DL are configured to provide data signals for the pixels P in stages. The display driver circuit 10 is configured to perform the driving method for a display panel provided in any embodiment of the present disclosure. The display device provided in the embodiments of the present disclosure may be a phone shown in FIG. 17 or may be any electronic product having a display function, including, but not limited to, a television, a laptop, a desktop display, a tablet computer, a digital camera, a smart bracelet, smart glasses, a vehicle-mounted display, a medical device, an industrial control device, and a touch interactive terminal. No limitations are made thereto in the embodiments of the present disclosure.

The display driver circuit of the display device provided in the embodiments of the present disclosure can perform the driving method for a display panel provided in any embodiment of the present disclosure to drive the display panel of the display device provided in the embodiments of the present disclosure. For the content not described in detail in the embodiments of the display device, reference may be made to the preceding description of the driving method for a display panel, and the details are not repeated here.

It is to be noted that the preceding are only alternative embodiments of the present disclosure and the technical principles used therein. It is to be understood by those skilled in the art that the present disclosure is not limited to the embodiments described herein. For those skilled in the art, various apparent modifications, adaptations, and substitutions can be made without departing from the scope of the present disclosure. Therefore, although the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A driving method for a display panel, wherein the display panel comprises a plurality of pixels arranged in an array and a plurality of data lines, pixels of a same column among the plurality of pixels are electrically connected to a respective one of the plurality of data lines, each of the plurality of data lines is configured to provide a data signal for a respective one of the plurality of pixels in each of a plurality of stages; wherein one frame comprises a plurality of stages, for each of the plurality of data lines, a plurality of voltage differences are acquired in one frame, and each of the plurality of voltage differences corresponds to a difference between voltages at two adjacent stages of the plurality of stages in a same frame; and wherein the driving method comprises:

before a current frame is displayed, acquiring a voltage difference between data signals provided in every two adjacent stages of the current frame for each of the plurality of data lines, to obtain the plurality of voltage differences in the current frame for each of the plurality of data lines;

determining a charge current of each of the plurality of stages of each of the plurality of data lines according to each of the plurality of voltage differences in the current frame for each of the plurality of data lines; and providing a data signal for each of the plurality of data lines with the charge current;

wherein determining the charge current of each of the plurality of stages of each of the plurality of data lines according to each of the plurality of voltage differences in the current frame for each of the plurality of data lines comprises:

determining an absolute value of each of the plurality of voltage differences on each of the plurality of data lines as a data difference;

calculating an average value of all data differences of the plurality of voltage differences of each of the plurality of data lines in the current frame as a first average value; and determining, according to the first average value, the charge current of each of the plurality of stages of each of the plurality of data lines in the current frame.

2. The driving method of claim 1, wherein determining the charge current of each of the plurality of stages of each of the plurality of data lines according to each of the plurality of voltage differences in the current frame for each of the plurality of data lines comprises:

acquiring a mapping relationship between each of the plurality of voltage differences in the current frame for each of the plurality of data lines and the charge current of each of the plurality of stages on each of the plurality of data lines; and determining the charge current of each of the plurality of stages of each of the plurality of data lines based on the mapping relationship and each of the plurality of voltage differences in the current frame for each of the plurality of data lines.

3. The driving method of claim 2, wherein when an absolute value of a voltage difference of the plurality of voltage differences in the current frame for a data line of the plurality of data lines is greater than or equal to a first threshold, a charge current for the data line is greater than or equal to a minimum charge current of the plurality of data lines in the display panel.

4. The driving method of claim 1, wherein the charge current of each of the plurality of stages on each of the plurality of data lines in the current frame is positively correlated to the first average value of each of the plurality of data lines.

5. The driving method of claim 1, wherein each of the plurality of stages corresponds to refreshing data signals of a respective row of pixels among the plurality of pixels;

wherein before the current frame is displayed, acquiring the voltage difference between the data signals provided in every two adjacent stages of the current frame for each of the plurality of data lines comprises:

before refreshing data signals of a next row of pixels among the plurality of pixels, acquiring a voltage difference between a data signal expected to be provided in a next stage and a data signal provided in a current stage.

6. The driving method of claim 5, wherein determining the charge current of each of the plurality of stages of each of the plurality of data lines according to each of the plurality of voltage differences in the current frame for each of the plurality of data lines comprises:

determining an absolute value of the voltage difference between the data signal expected to be provided in the next stage and the data signal provided in the current stage as a data difference; and determining, according to the data difference, the charge current when a data signal is provided in the next stage.

7. The driving method of claim 6, wherein the charge current is positively correlated to the data difference in the next stage.

8. A driving method for a display panel, wherein the display panel comprises a plurality of pixels arranged in an array and a plurality of data lines, pixels of a same column among the plurality of pixels are electrically connected to a respective one of the plurality of data lines, each of the plurality of data lines is configured to provide a data signal for a respective one of the plurality of pixels in each of a plurality of stages; wherein one frame comprises a plurality of stages, for each of the plurality of data lines, a plurality of voltage differences are acquired in one frame, and each of the plurality of voltage differences corresponds to a difference between voltages at two adjacent stages of the plurality of stages in a same frame; and wherein the driving method comprises:

before a current frame is displayed, acquiring a voltage difference between data signals provided in every two adjacent stages of the current frame for each of the plurality of data lines, to obtain the plurality of voltage differences in the current frame for each of the plurality of data lines;

determining a charge current of each of the plurality of stages of each of the plurality of data lines according to each of the plurality of voltage differences in the current frame for each of the plurality of data lines; and providing a data signal for each of the plurality of data lines with the charge current;

wherein determining the charge current of each of the plurality of stages of each of the plurality of data lines according to each of the plurality of voltage differences in the current frame for each of the plurality of data lines comprises:

determining an absolute value of each of the plurality of voltage differences on each of the plurality of data lines as a data difference;

calculating an average value of all data differences of the plurality of voltage differences of each of the plurality of data lines in the current frame as a first average value;

calculating an average value of all first average values of all of the plurality of data lines in the current frame as a second average value; and determining, according to the second average value, the charge current of each of the plurality of stages of each of the plurality of data lines in the current frame.

9. The driving method of claim 8, wherein the charge current of each of the plurality of stages on each of the plurality of data lines in the current frame is positively correlated to the second average value of each of the plurality of data lines.

10. A display device, comprising a display panel and a display driver circuit;

wherein the display panel comprises a plurality of pixels arranged in an array and a plurality of data lines, pixels of a same column among the plurality of pixels are electrically connected to a respective one of the plurality of data lines, each of the plurality of data lines is configured to provide a data signal for a respective one of the plurality of pixels in each of a plurality of stages: wherein one frame comprises a plurality of stages, for each of the plurality of data lines, a plurality of voltage differences are acquired in one frame, and each of the plurality of voltage differences corresponds to a difference between voltages at two adjacent stages of the plurality of stages in a same frame; and wherein the display driver circuit is configured to perform the driving method for the display panel according to claim 8.

11. A display device, comprising a display panel and a display driver circuit;

wherein the display panel comprises a plurality of pixels arranged in an array and a plurality of data lines, pixels of a same column among the plurality of pixels are electrically connected to a respective one of the plurality of data lines, each of the plurality of data lines is configured to provide a data signal for a respective one of the plurality of pixels in each of a plurality of stages; wherein one frame comprises a plurality of stages, for each of the plurality of data lines, a plurality of voltage differences are acquired in one frame, and each of the plurality of voltage differences corresponds to a difference between voltages at two adjacent stages of the plurality of stages in a same frame; and wherein the display driver circuit is configured to perform a driving method for the display panel, and the driving method comprises:

before a current frame is displayed, acquiring a voltage difference between data signals provided in every two adjacent stages of the current frame for each of the plurality of data lines, to obtain the plurality of voltage differences in the current frame for each of the plurality of data lines;

determining a charge current of each of the plurality of stages of each of the plurality of data lines according to each of the plurality of voltage differences in the current frame for each of the plurality of data lines; and providing a data signal for each of the plurality of data lines with the charge current;

wherein the display driver circuit is configured to perform determining the charge current of each of the plurality of stages of each of the plurality of data lines according to each of the plurality of voltage differences in the current frame for each of the plurality of data lines by:

determining an absolute value of each of the plurality of voltage differences on each of the plurality of data lines as a data difference;

calculating an average value of all data differences of the plurality of voltage differences of each of the plurality of data lines in the current frame as a first average value; and determining, according to the first average value, the charge current of each of the plurality of stages of each of the plurality of data lines in the current frame.

12. The display device of claim 11, wherein the display driver circuit is configured to perform determining the charge current of each of the plurality of stages of each of the plurality of data lines according to each of the plurality of voltage differences in the current frame for each of the plurality of data lines by:

acquiring a mapping relationship between each of the plurality of voltage differences in the current frame for each of the plurality of data lines and the charge current of each of the plurality of stages on each of the plurality of data lines; and determining the charge current of each of the plurality of stages of each of the plurality of data lines based on the mapping relationship and each of the plurality of voltage differences in the current frame for each of the plurality of data lines.

13. The display device of claim 12, wherein when an absolute value of a voltage difference of the plurality of voltage differences in the current frame for a data line of the plurality of data lines is greater than or equal to a first threshold, a charge current for the data line is greater than or equal to a minimum charge current of the plurality of data lines in the display panel.

14. The display device of claim 11, wherein the charge current of each of the plurality of stages on each of the plurality of data lines in the current frame is positively correlated to the first average value of each of the plurality of data lines.

* * * * *